United States Patent [19]

McCowin

[11] Patent Number: 4,699,683

[45] Date of Patent: Oct. 13, 1987

[54] MULTIROVING FIBER LAMINATOR

[75] Inventor: Peter D. McCowin, Federal Way, Wash.

[73] Assignee: The Boeing Company, Seattle, Wash.

[21] Appl. No.: 827,146

[22] Filed: Feb. 7, 1986

[51] Int. Cl.[4] .............................................. B32B 31/04
[52] U.S. Cl. .................................... 156/353; 156/510;
156/511; 156/522; 156/523; 156/538; 156/574;
156/577
[58] Field of Search ............... 156/353, 358, 510, 522,
156/523, 527, 538, 574, 577

[56] References Cited

U.S. PATENT DOCUMENTS

| 799,374 | 9/1905 | Gray et al. | |
|---|---|---|---|
| 920,776 | 5/1909 | Pohl | |
| 1,132,837 | 3/1915 | Eggleston | |
| 1,195,554 | 8/1916 | Bourdin | |
| 1,370,339 | 3/1921 | Midgley | |
| 1,420,271 | 6/1922 | McLane | |
| 1,464,632 | 8/1923 | Wayne | |
| 1,512,096 | 10/1924 | Hopkinson | |
| 2,182,358 | 12/1939 | Sherts et al. | 18/17 |
| 2,220,760 | 11/1940 | Gates et al. | 26/63 |
| 2,345,541 | 3/1944 | Scholze, Jr. | 34/31 |
| 2,722,590 | 11/1955 | Engler | 219/19 |
| 3,037,898 | 6/1962 | Zumofen | 156/94 |
| 3,602,416 | 8/1971 | Basche et al. | 226/196 |
| 3,695,977 | 10/1972 | Kandelaki et al. | 156/441 |
| 3,992,240 | 11/1976 | Kuehn | 156/522 |
| 4,100,004 | 7/1978 | Moss et al. | 156/60 |
| 4,461,669 | 7/1984 | Dontscheff | 156/574 |
| 4,557,790 | 12/1985 | Wiseby | 156/574 |
| 4,569,716 | 2/1986 | Pugh | 156/577 |

OTHER PUBLICATIONS

T941,011—Defensive Publication, 12/2/75, "Automatic Controlled Apparatus for Producing Tobacco Smoke Filter Rods" (Morrison et al.).

Primary Examiner—Caleb Weston

Attorney, Agent, or Firm—Christensen, O'Connor, Johnson & Kindness

[57] ABSTRACT

A fiber laminator for simultaneously laying down a strip of parallel, flat fiber rovings is disclosed. A head (53) for dispensing the rovings to be laid down is supported by a gantry (51). The gantry (51) includes mechanisms for moving the dispensing head longitudinally along three orthogonal axes (X, Y, Z) and rotationally about a vertical axis(c). Further, the dispensing head is designed for rotational movement about a horizontal axis(a). Thus, the dispensing head is movable along a complex path-of-travel as the fiber rovings are laid down. Each fiber roving is supplied by a spool (30) mounted on one side of the head. After leaving the spools (301), the fiber rovings pass through nip rollers (305) that apply a slight pressure to the already flat rovings to remove any remaining thickness irregularities. Thereafter, the rovings are directed to individual modules each of which includes a separately controlled rethreading mechanism (713) and a separate shear mechanism (741). Because the rethreading mechanism (713) and the shear mechanisms (741) are separately controllable, individual rovings can be deleted from and/or added to a fiber roving strip as it is being laid down. The modules are mounted in a subframe (503) attached to a mainframe (501). Located between the mainframe (501) and a support structure is an air insulator cushion (541) that applies vertical pressure to the subframe (503). After leaving the modules, the rovings are pressed against an underlying contoured surface, e.g., a tool, by a tack down roller (511) mounted at the lower end of the subframe. Constant pressure over slight elevation changes is maintain by the air insulator cushion (541). Large elevation changes cause the gantry (51) to elevate the entire head (53). Mounted on opposite sides of the subframe roller are laser cameras (521) whose outputs are used to control the position of the dispensing head (53) and, thus, the tack down roller (511) about the head's rotational horizontal axis (a).

38 Claims, 34 Drawing Figures

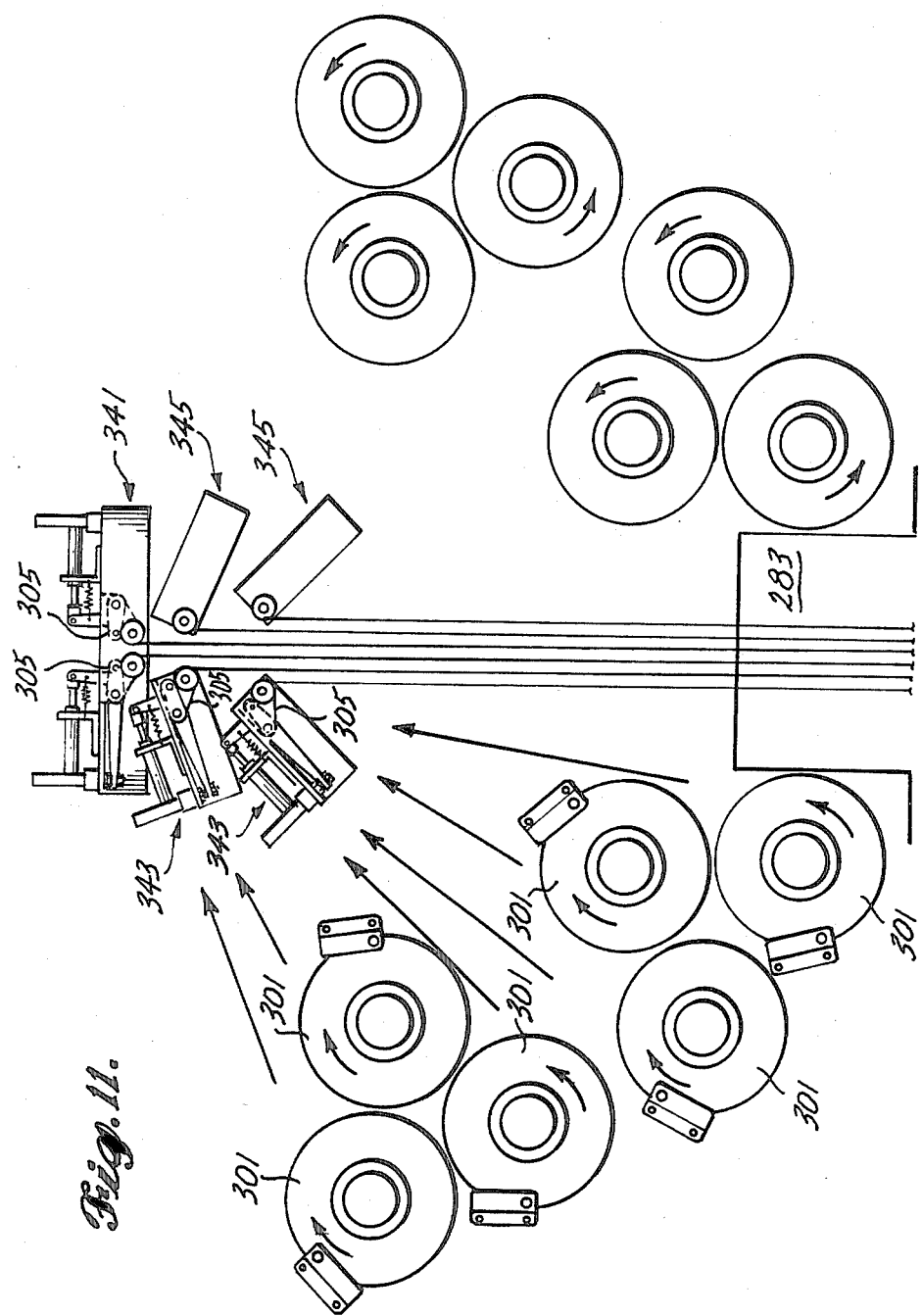

Fig. 19.

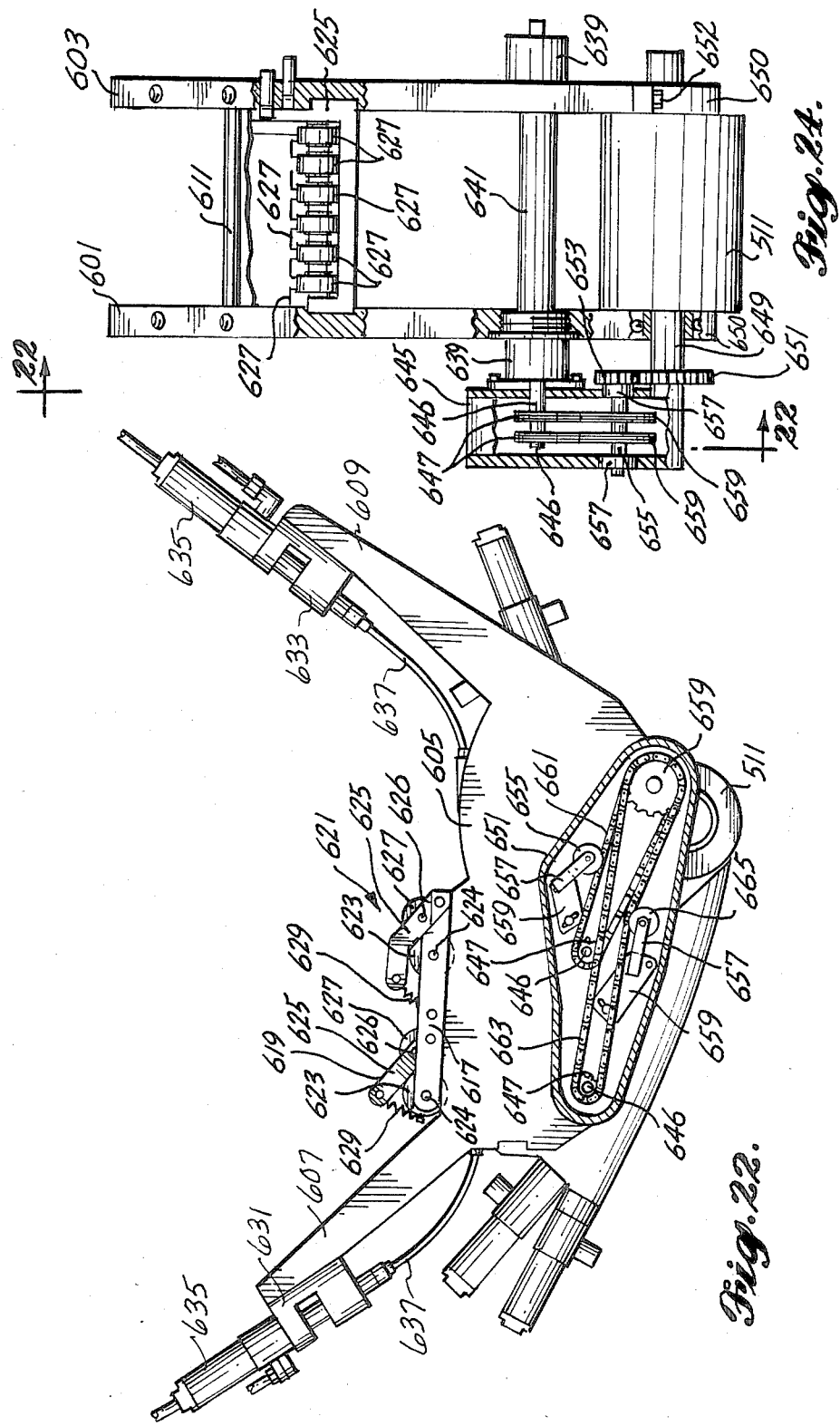

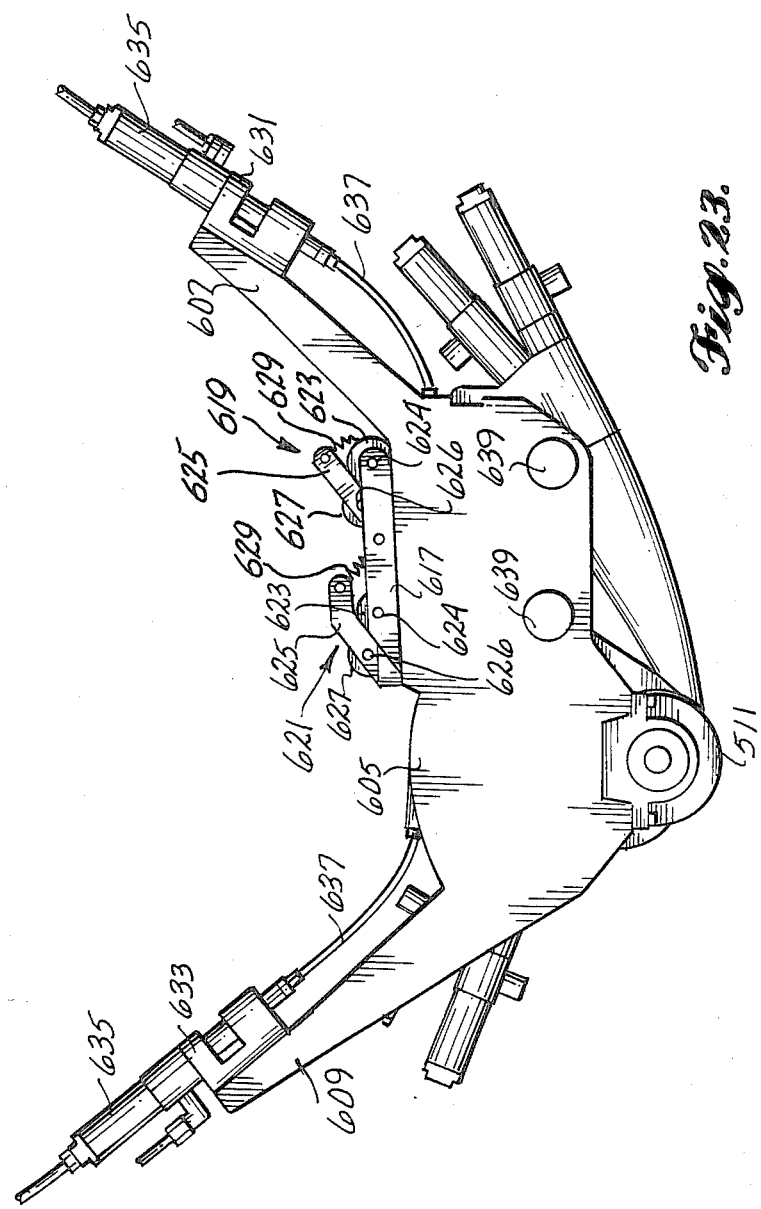

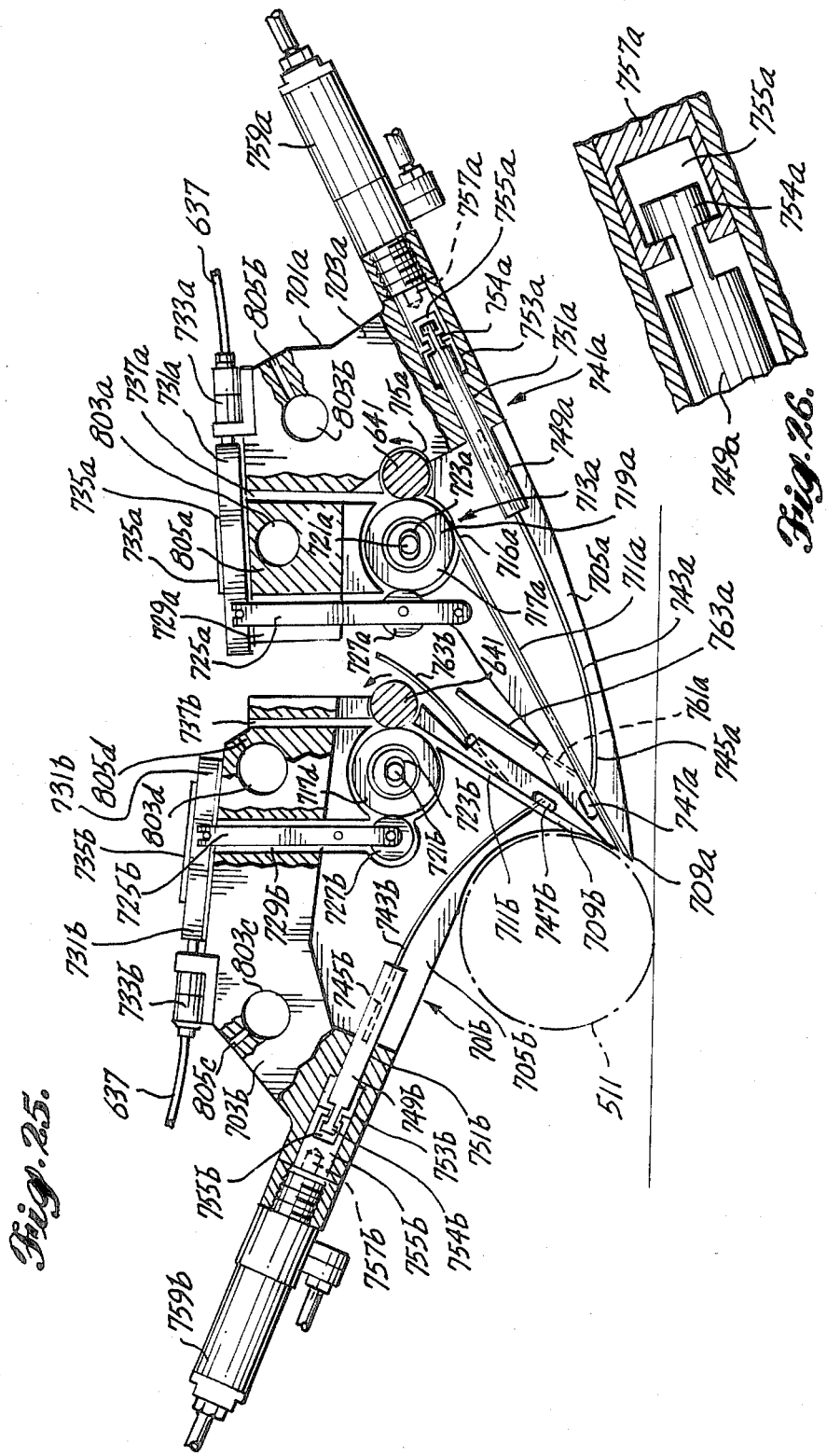

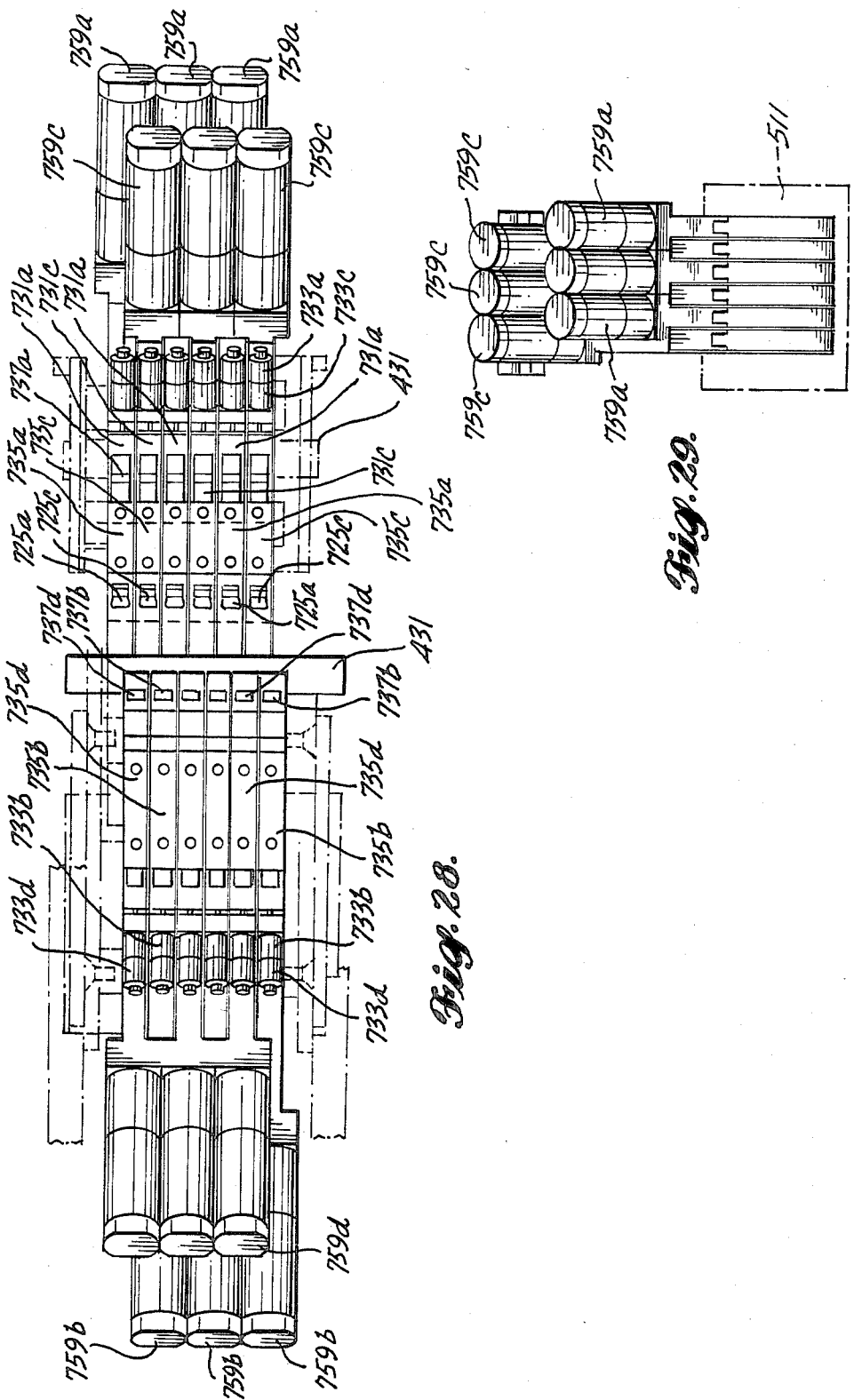

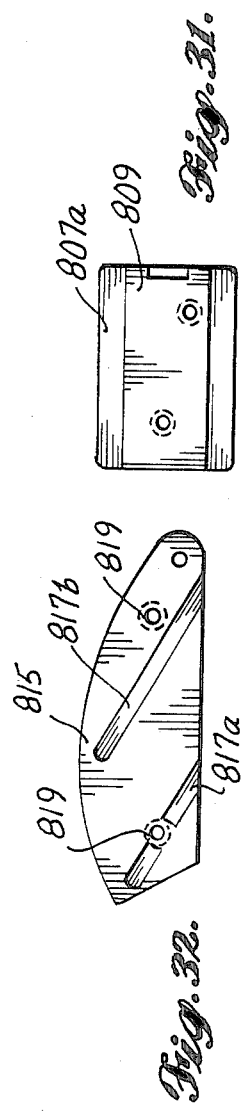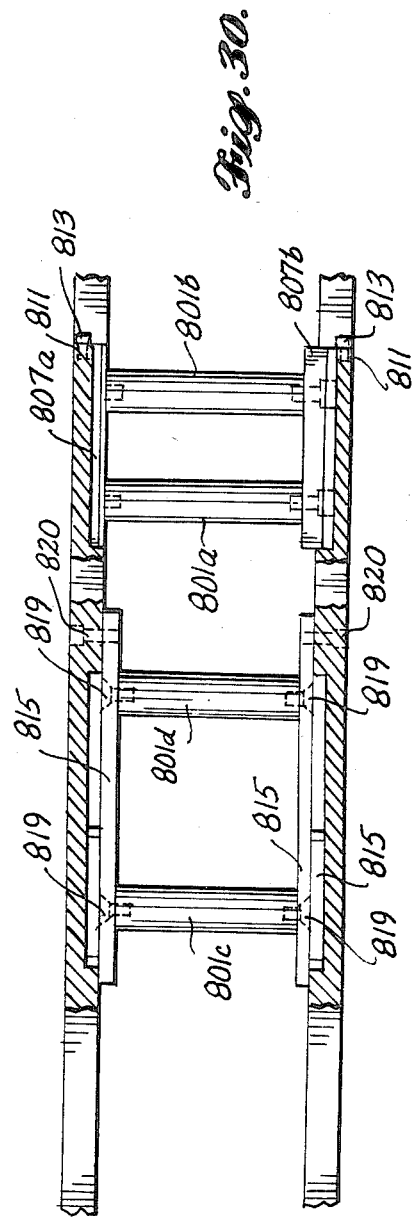

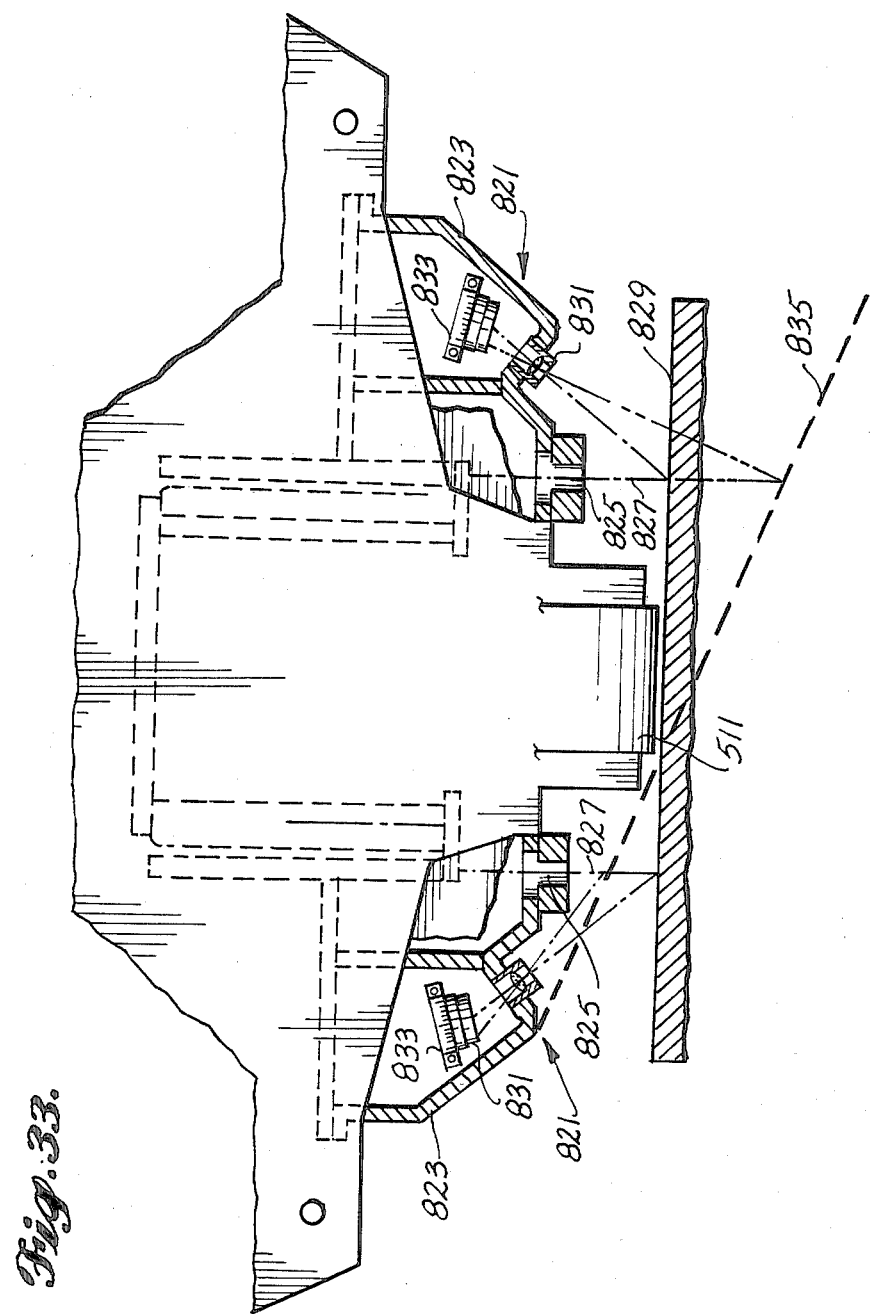

MULTIROVING FIBER LAMINATOR

TECHNICAL AREA

This invention relates to apparatus for creating fiber reinforced resin composites and, more particularly, apparatus for use in laying down the rovings of fibers used to form fiber reinforced resin composites.

BACKGROUND OF THE INVENTION

In recent years the use of fiber reinforced resin composites in the aerospace field has become more and more widespread. Such composites are usually formed by laying down fiber rovings (e.g., fiber yarn) preimpregnated with epoxy resin. At present, the preferred fiber used to form the rovings is graphite filament fiber. The rovings are laid downside by side, i.e., in parallel to create layers. The layers are oriented at different angles with respect to one another, the angles and number of layers running in each direction depending upon the directional strength requirements of the resultant structure. After a structure is laid up, it is placed in an autoclave and the resin cured.

Fiber reinforced resin composite technology has been used to create a wide variety of airframe structural elements, many of which have airfoil shapes -- flaps, ailerons, elevators and rudders, for examples. The entire airframe of some aircraft, including the fuselage, wings and horizontal and vertical stabilizers, have been formed entirely of fiber reinforced resin composites.

While fiber reinforced resin composites have strength and weight advantages over more traditional airframe materials, such as aluminum, they have certain manufacturing disadvantages. Specifically, because aluminum is malleable, it can be easily bent into various airfoil shapes and configurations. Contrariwise, after being cured, fiber reinforced resin composites are not malleable. As a result, fiber reinforced resin composites must be configured prior to curing. The configuring of fiber reinforced resin composites is normally accomplished by laying the fiber rovings atop a form, commonly referred to as a tool. After a suitable number of fiber roving layers have been "laid up," the tool is placed in the autoclave with the layup while the layup resin is cured.

Prior to the present invention, fiber reinforced resin composite layups have been formed by laying down strips of fiber roving tape by hand or using a machine designed for such a purpose. U.S. Pat. No. 4,461,669 discloses a machine for laying down strips of fiber roving tape. Fiber roving tape is formed of a plurality of parallel oriented rovings impregnated with resin mounted on a backing material or in some other manner held together.

The major disadvantage of the use of tapes to create fiber reinforced resin composites relates to the lack of flexibility inherent in tapes. Because tapes are formed of rovings of equal length held together by a backing paper, it is extremely difficult if not impossible to steer the tape in the plane of the tape. That is, it is most difficult to create a smooth curve in the plane of the tape except at extremely hard large radiuses of curvature. Further, because the rovings that form the tape are held together, it is difficult if not impossible to decrease the width of a section of tape as it is being dispensed. As a result, it is difficult to change width and/or thickness of the resultant composite in a smooth manner. The invention is directed to overcoming these and other disadvantages associated with the laying up of fiber reinforced resin composites.

SUMMARY OF THE INVENTION

In accordance with this invention, a fiber laminator for simultaneously laying down a strip of parallel, flat fiber rovings atop a tool is provided. The strip is laid down by a dispensing head supported by a gantry. The gantry includes mechanisms for moving the head along multiple axes. As a result, the head is capable of moving along a complex path-of-travel as it lays down fiber rovings. The flat fiber rovings are supplied in a manner that allows each roving to be dispensed at a different rate. The rovings pass through separately actuable rethreading mechanisms and separately actuable cutters. As a result, individual rovings can be deleted from and/or added to a fiber roving strip as it is being laid down. The rovings are pressed against an underlying surface by a tack down roller positioned at the base of the dispensing head.

In accordance with other aspects of this invention, the gantry mechanisms are capable of moving the dispensing head along three orthogonal longitudinal axes. Preferably, the axes are oriented such that two of the longitudinal axes are horizontal and the third is vertical.

In accordance with further aspects of this invention, the gantry mechanism is also capable of rotating the dispensing head about the vertical axis.

In accordance with still other aspects of this invention, the dispensing head includes a mechanism for rotating the tack down roller about a horizontal axis.

In accordance with still further aspects of this invention, the dispensing head includes a support structure and a dispensing mechanism. The support structure is supported by the gantry and the dispensing mechanism is supported by the support structure. The dispensing mechanism is supported such that the dispensing mechanism can move over a small vertical range relative to the support structure. The tack down roller forms part of the dispensing mechanism. Mounted between the support structure and the dispensing mechanism is a pressure chamber positioned to apply a vertical force to the dispensing mechanism, and, thus, press the tack down roller against an underlying surface with a predetermined amount of constant vertical pressure over slight changes in surface elevation. Preferably the pressure chamber is in the form of an air bag that provides an isolation and uniform compaction tack down force to the tack down roller. Large elevation changes cause the gantry to vertically move the entire head. Preferably large elevation changes are sensed by a surface height measuring laser camera system.

In accordance with yet other aspects of this invention, a pair of laser cameras are mounted on the support structure -- one on each side of the tack down roller. Each laser camera detects the distance between the camera and the underlying surface. The distances are compared and the result used to position the tack down roller about its horizontal axis of rotation. Additionally, the laser cameras provide the height information used to cause the gantry to vertically move the head when large elevation changes occur. The laser cameras may also provide horizontal compensation information.

In accordance with yet further aspects of this invention, the subframe supports a plurality of modules, one for each of the flat fiber rovings to be dispensed. Each module includes one of the separately actuable rethreading mechanisms and one of the separately actuable cutters.

In accordance with yet still other aspects of this invention, the rovings are supplied by a plurality of spools mounted on the support structure. A drag and brake mechanism is associated with each roving spool. The drag and brake mechanism applies a slight drag force to the spools when rovings are being dispensed and a brake force when the cutter associated with a particular roving is energized. Both drag and brake force are removed during rethreading.

In accordance with yet still further aspects of this invention, after leaving their respective spools, each flat fiber roving passes through a set of nip rollers before entering its associated rethreading mechanism. The nip rollers smooth out roving thickness irregularities as the rovings are being dispensed. During rethreading, the nip roller force is relaxed.

As will be ready appreciated from the foregoing description, the invention provides a multiroving fiber laminator, i.e., a fiber laminator that has the ability to lay down a strip of parallel, flat fiber rovings. Because the rovings are separately drawn from spools, the rate rovings are dispensed can vary from roving to roving. As a results, a steerable roving strip can be laid down. Further, because rovings can be individually added or deleted as a roving strip is being laid down, roving strip width can be changed as a layup is being formed. Because the dispensing head is supported by a gantry having multiaxis positioning mechanisms, the invention has the ability to create a layup on tools having a wide variety of different contours. This ability is improved by the inclusion of a pressure chamber for applying constant elevational pressure to the task down roller and by the inclusion of elevation sensing laser cameras located on opposite sides of the roller.

BRIEF DESCRIPTION OF THE DRAWINGS

The foregoing and other advantages of this invention will become more readily appreciated as the same becomes better understood by reference to the following detailed description when taken in conjunction with the accompanying drawings wherein:

FIG. 10 is a pictorial view of the roving supply mechanism that forms part of the fiber laminator head of the multiroving fiber laminator illustrated in FIG. 1;

FIG. 11 is a plan view showing the path-of-travel of fiber rovings through the roving supply mechanism illustrated in FIG. 10;

FIG. 19 is an elevational view of one side of the roving dispensing mechanism illustrated in FIG. 18;

FIG. 22 is an elevational view of one side of a subframe forming a part of the roving dispensing mechanism illustrated in FIG. 18;

FIG. 23 is an elevational view of the other side of the subframe illustrated in FIG. 22;

FIG. 24 is an end elevational view, partially in section, of the subframe illustrated in FIG. 22;

FIG. 25 is a cross-sectional view, partially in section, of a set of lower roving dispensing modules suitable for mounting in the subframe illustrated in FIGS. 22–24;

FIG. 26 is an enlarged view of a portion of FIG. 25;

FIG. 28 is a top view of all of the lower and upper sets of roving dispensing modules mounted in the subframe illustrated in FIGS. 22–24;

FIG. 29 is a side elevational view of FIG. 27;

FIG. 30 is a plan view, partially in section, of the mechanism for mounting the lower and upper sets of roving dispensing modules in subframe illustrated in FIGS. 22–24;

FIG. 31 is a side elevational view of a portion of the mounting mechanism illustrated in FIG. 30;

FIG. 32 is a side elevational view of another portion of the mounting mechanism illustrated in FIG. 30;

FIG. 33 is a side elevational view of the laser camera system forming part of the roving dispensing mechanism illustrated in FIG. 18.

DESCRIPTION OF THE PREFERRED EMBODIMENT

Figure 1:
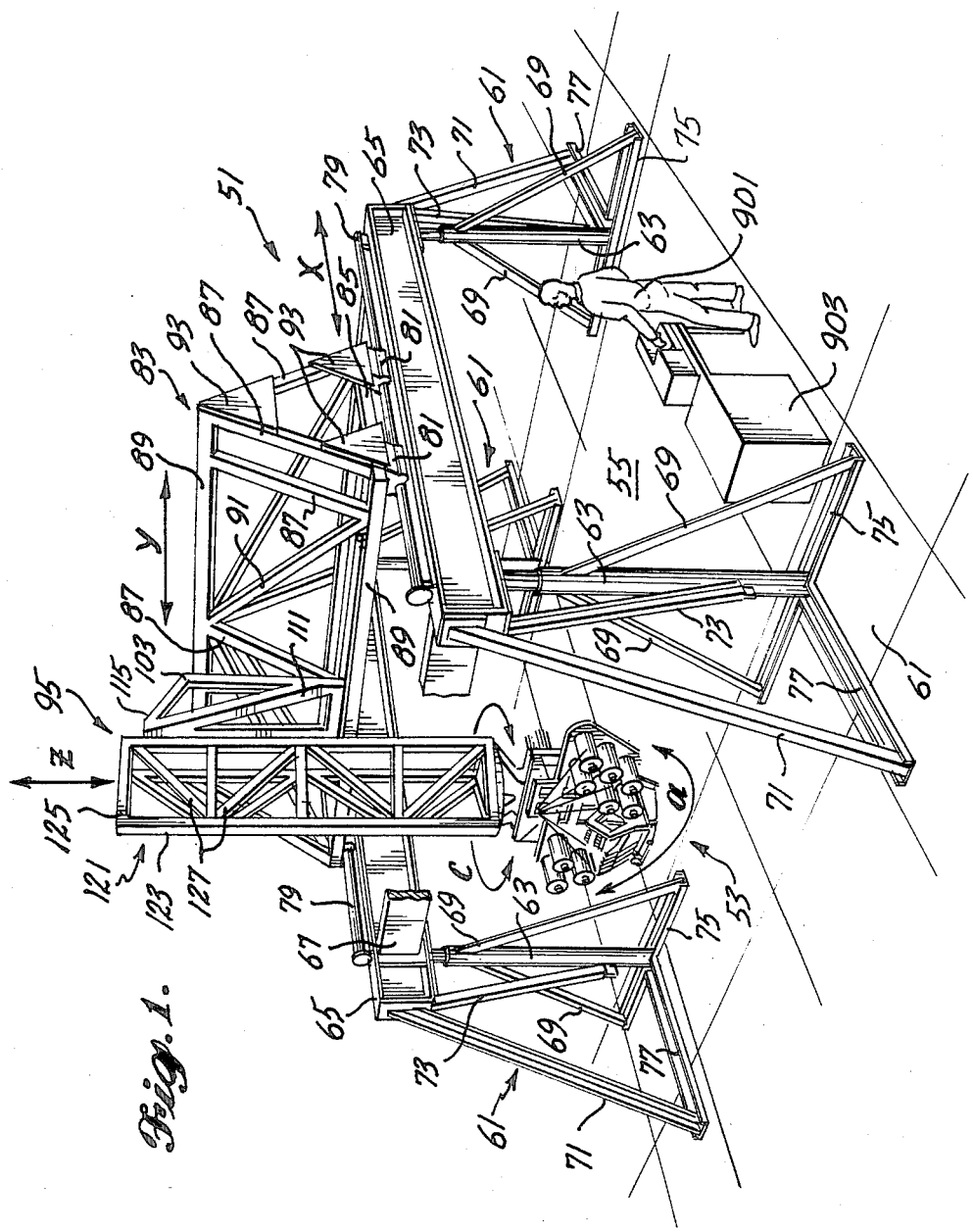
FIG. 1 is a pictorial view of a multiroving fiber laminator formed in accordance with the invention.

As illustrated in FIG. 1, in general, a multiroving fiber laminator formed in accordance with the invention comprises a gantry 51 that supports and moves a fiber laminator head 53 over a work surface 55. While, for ease of illustration, the work surface 55 is illustrated as a portion of floor that supports the gantry 51, it is to be understood that the work surface 55 could also be a table or a raised platform, or any other surface suitable for supporting a form having a surface upon which fiber rovings are to be laid during the creation of a fiber reinforced resin composite. Such forms are commonly referred to in the aircraft and other industries as tools. Since fiber reinforced resin composite forms or tools are well known in the aircraft and other industries and since such forms or tools do not form a part of the present invention, they are not described here.

As illustrated in FIG. 1, the gantry 51 is capable of moving the laminator head 53 along three orthogonal longitudinal axes defined as the X, Y and Z axes. As illustrated in FIG. 1, preferably, the X and Y axes lie in a horizontal plane and the Z-axis is vertical. In addition to moving the fiber laminator head longitudinally, the gantry 51 is capable of moving the fiber laminator head along a rotational path-of-travel about the Z-axis. This rotational axis is defined as the c-axis. The fiber laminator head is designed for movement along a second rotational axis defined as the a-axis. As illustrated in FIG. 1, a-axis movement is about a horizontal axis whose position depends upon the position of the fiber laminator head along the c-axis.

The gantry 51 includes four pedestals 61, one positioned at each of the corners of a rectangle. Each pedestal 61 inches a vertical post 63. Mounted atop the vertical posts 63 are two main beams 65. The main beams are positioned such that they lie parallel to one another and are supported at either end by a vertical post 63. Two crossbeams 67, one located at either end of the main beams, are attached to and join the main beams together. As a result, the posts support a rectangular frame. In addition to the posts 63, the pedestals include a plurality of braces. A pair of side braces 69 extend between each post 63 and a first base plate 75 lying on the floor 55 beneath the post and positioned orthogonal to the longitudinal axis of the main beams 65. An end brace 71 extends from each end of the main beams 65 to second base plates 77 lying orthogonal to each of the first base plates 75. Finally, a brace 73 extends between the bottoms of the main beams 65 and each of the posts 63. As a result, the rectangular frame formed by the main beams 65 and the crossbeams 67 are rigidly supported by the pedestals 61.

The main beams 65 define the X direction of movement. That is, the main beams lie parallel to the X-axis. Mounted atop each of the main beams 65 is a round X-axis way 79. Slidably mounted on each of the X-axis ways 79 is a pair of spaced-apart x-axis pillow blocks 81. The x-axis pillow blocks 81 are affixed to the bottom of an X-axis truss 83. As a result, the X-axis truss orthogonally spans the region between the X-axis ways 79. Because the X-axis truss orthogonally spans the X-axis ways, the X-axis truss 83 has a longitudinal axis lying in the Y direction.

Figure 3:
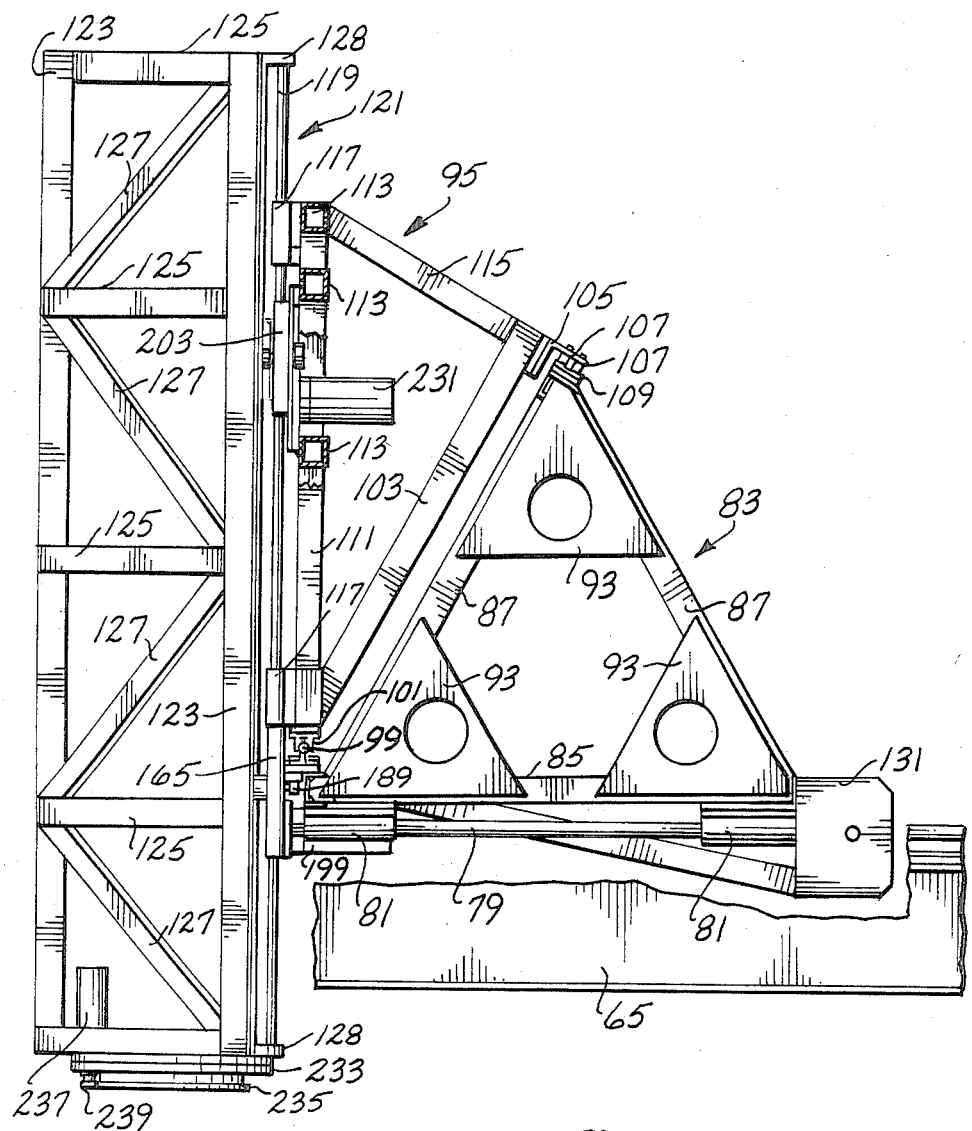
FIG. 3 is a side elevational view of the upper portion of the gantry of the multiroving fiber laminator illustrated in FIG. 1.

In the cross-sectional direction, as best illustrated in FIG. 3, the X-axis truss defines an equilateral triangle. More specifically, the equilateral triangle is defined by a series of equal length base and inclined beams 85 and 87 joined together at their ends to form equilateral triangular frames that are spaced apart along the length of the X-axis truss 83. Affixed to the bottom of the base beams 85 located on the ends of the X-axis truss 83 are the X-axis pillow blocks 81.

Longitudinal beams 89 that span the x-axis truss 83 are affixed to the base and inclined beams 85 and 87 that form the equilateral triangular frames. Support braces 91 running between the base and inclined beams 85 and 87 and the longitudinal beams 89 provide lateral support. As necessary, gussets 93 are attached to the various joints to provide rigidity, particularly at the joints between the base and inclined beams 85 and 87 that form the equilateral triangular frames located at the ends of the X-axis truss 83 as shown in FIG. 3.

Slidably mounted on the X-axis truss 83 is a Y-axis truss 95. The Y-axis truss 95 includes a bottom beam 97, best seen in FIG. 2. The bottom beam 97 overlies a round Y-axis way 99 mounted atop a longitudinal beam 89 located at the junction between the base beam 85 and one of the inclined beams 87 that form the equilateral triangular frames of the X-axis truss 83. Affixed to the lower surface of the bottom beam 97 of the Y-axis truss 95, at either end thereof, are Y-axis pillow blocks 101. The Y-axis pillow blocks are slidably mounted on the Y-axis was 99. Extending upwardly from the bottom beam 97 of the Y-axis truss 95 are rear beams 103. The rear beams 103 converge toward one another and lie parallel to the adjacent inclined face of the X-axis truss 83, as illustrated in FIG. 3. Affixed to the upper end of the rear beams 103 is an angle bracket 105 that overlies the top of the X-axis truss 83. Mounted on the outwardly extending arm of the angle bracket 105 are a pair of rollers 107 that lie on either side of a longitudinal guide 109 affixed to the top of the X-axis truss 83.

Extending vertically upwardly and converging toward one another from opposite ends of the top of the bottom beam 97 of the Y-axis truss 95 are a pair of front beams 111. Running between the front beams 111 are a plurality of horizontal support beams 113. Extending between the top of the front beams 111 and the top of the rear beams 103 of the Y-axis truss 95 are top beams 115. Preferably, the angle between the top beams 115 and the rear beams 103 is 90°. As a result, when viewed in side elevation (FIG. 3), the rear beams 103, the front beams 111 and the top beams 115 define a right triangle.

Attached to the horizontal support beams 113 that extend between the front beams 111 of the Y-axis truss 95 are Z-axis pillow blocks 117. Slidably mounted on the Z-axis pillow blocks 117 is a round Z-axis way 119. The Z-axis way 119 is affixed to the rear face of a Z-axis truss 121.

The Z-axis truss 121 has a triangular cross-sectional shape when viewed from above and includes three vertical beams 123, one located at each corner of the triangle. Running between the vertical beams 123, at spaced-apart locations, are a plurality of horizontal braces 125. Running between the points where the horizontal braces 125 meet the vertical beams 123 area plurality of lateral braces 127. The round Z-axis way 119 is attached by a pair of brackets 128. The brackets are located at opposite ends of the way, on the side of the Z-axis truss 121 that faces the Y-axis truss 95. The Z-axis way is mounted such that the longitudinal axis of the way is vertically oriented.

As will be appreciated from the foregoing description, the X-axis truss 83 is slidably mounted on the X-axis ways 79. As a result, the X-axis truss is movable in the X direction. The Y-axis truss 95 is slidably mounted on the X-axis truss 83 for movement in the Y direction. Finally, the Z-axis truss 121 is slidably mounted on the Y-axis truss 95 for movement in the Z direction. Movement of the X-axis truss 83, the Y-axis truss 95 and the Z-axis truss 122 in the X, Y and Z direction is controlled by computer controlled servo motor mechanisms. The servo motor mechanisms that control truss movement in the X, Y and Z directions are next described.

Figure 4:
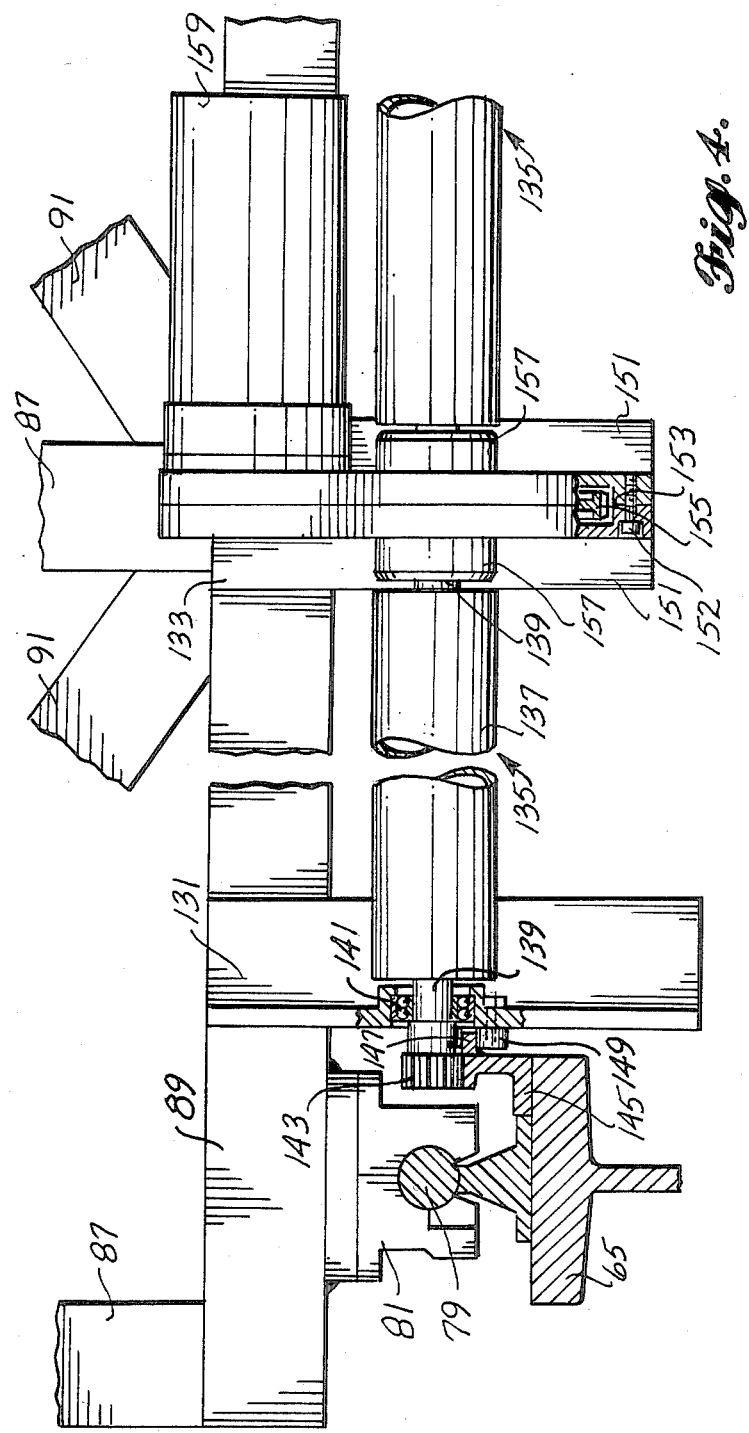
FIG. 4 is an elevational view, partially in section, of the X-axis drive mechanism of the gantry of the multiroving fiber laminator illustrated in FIG. 1.

Attached to the longitudinal beam 89 that is located along the lower corner of the equilateral triangular frames of the X-axis truss 83 on the side of the X-axis truss opposite to the Y-axis truss 95 are a pair of end brackets 131. Attached to the same horizontal beam 89 near the center thereof is a center bracket 133. As shown in FIG. 4, extending between the end brackets 131 and center bracket 133 are shafts 135. Preferably the shafts 135 include relatively large diameter hollow center sections 137 and short stub shafts 139 extending longitudinally outwardly from either end of the center sections. The stub shafts 139 pass through bearings 141 mounted in the end brackets 131. Affixed to (or formed in) the outer ends of the stub shafts are spur gears 143. The spur gears are positioned such that the teeth of the spur gears lie above and coact with the teeth of racks 145 mounted atop the main beams 65 that support the X-axis ways 79. More specifically, the racks 145 lie parallel to the X-axis ways 79 on the sides thereof that face the end brackets 131. As a result, when the shafts are rotated in the manner hereinafter described the interaction between the teeth of the spur gears 143 and the teeth of the racks 145 cause movement of the shafts 135 in a direction transverse to the longitudinal axis of the shaft. As a result, the X-axis truss, which is attached to the shafts 135, is moved in the X direction.

Figure 5:
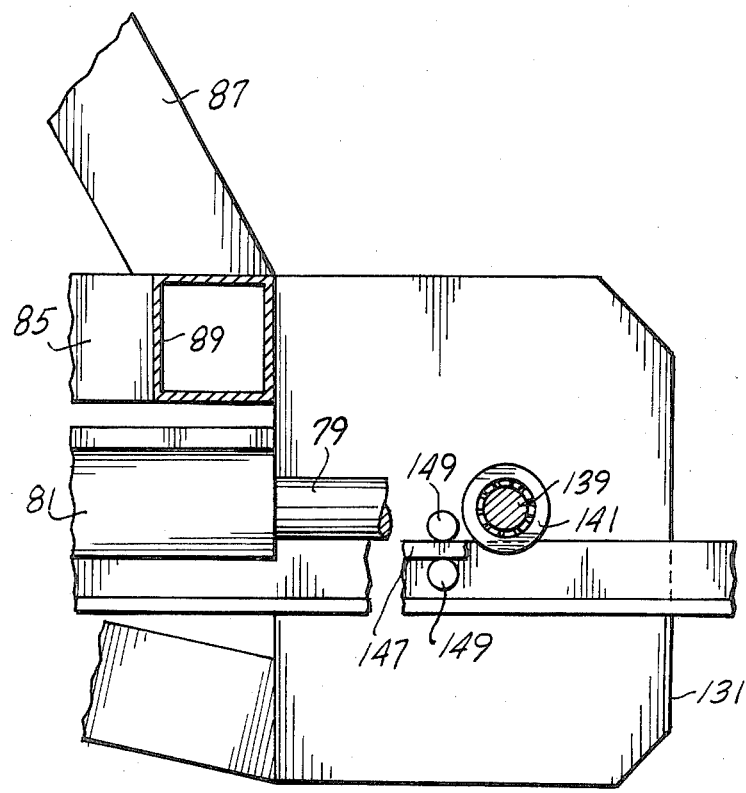
FIG. 5 is an end elevational view of the X-axis drive mechanism illustrated in FIG. 4.

Formed along the edge of the racks 145, on the side thereof that faces the end brackets 131, are guides 147. The guides 147 are elongate and have a rectangular cross-sectional configuration. The longitudinal axes of the guides 147 lie parallel to the longitudinal axes of the teeth of the racks 145 and the X-axis ways 79. Rotatably mounted to the surface of the end brackets 131 adjacent to each of the guides 147 are a pair of rollers 149. One roller is positioned above its related guide and the other is positioned below as shown in FIG. 5. The positioning is such that the guide rollers ride on the guides. the interaction between the guide rollers 149 and the guides 147 maintains the teeth of the spur gears 143 in contact with the teeth of the racks 145 as the X-axis truss is moved in the X direction when the shafts 135 are rotated in the manner described below.

The center bracket 133 is formed of two L-shaped pieces 151 attached to one another in a back-to-back manner by bolts 152. Formed in the adjoining legs of the L-shaped pieces 151 is a cavity 153. Mounted in the cavity 153 is a large diameter spur gear 155. The stub shafts 139 located on the inner ends of the shafts 135 pass through bearings mounted in housings 157 located on the outer faces of the adjoining legs of the L-shaped pieces 151 that form the center bracket 133. The stub shafts are splined or in some other manner attached to the large spur gear 155. As a result, when the large spur gear 155 is rotated in the manner hereinafter described, the shafts 135 are rotated and cause movement of the X-axis truss 83 in the manner heretofore described.

Mounted on the legs of one of the L-shaped pieces 151 that contain the cavity 153 that houses the large spur gear 155 is an X-axis servo motor 159. The shaft of the X-axis servo motor extends into the cavity 153. Mounted on the servo motor shaft is a small diameter spur gear positioned such that the teeth of the small spur gear engage the teeth in the large spur gear 155. As a result, when the X-axis servo motor 159 is energized, the large spur gear 155 is rotated. As previously discussed, rotation of the large gear 155 rotates the shafts 135 resulting in the teeth of the stub shaft spur gears 143 coacting with the teeth of the racks 145 and moving the X-axis truss in the X direction.

Figure 6:
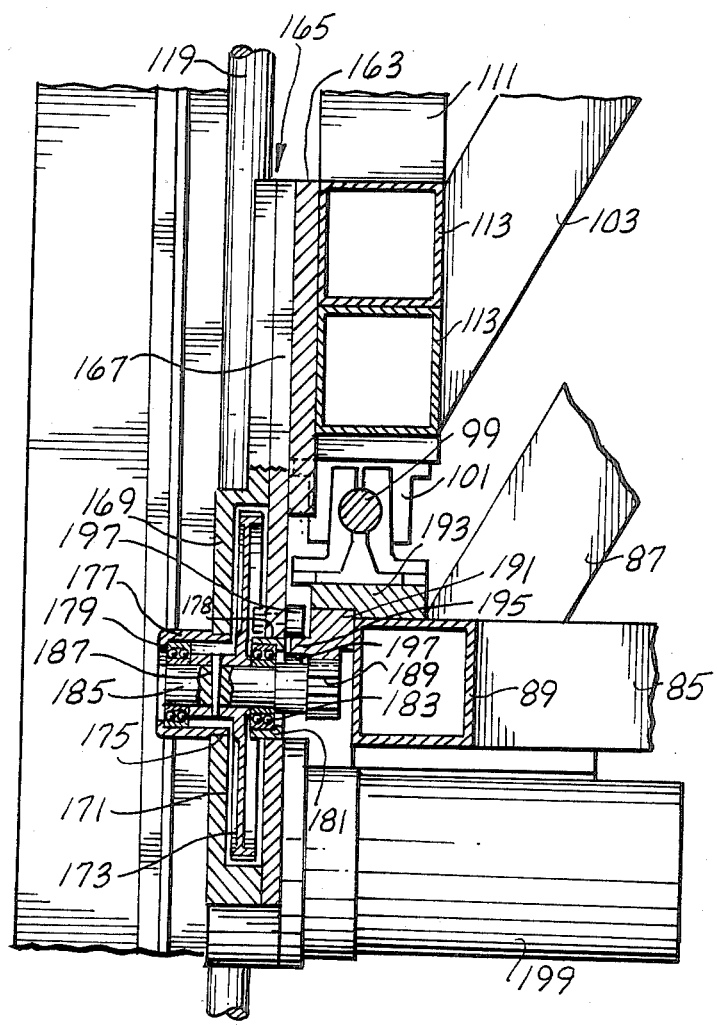
FIG. 6 is an elevational view, partially in section, of the Y-axis drive mechanism of the gantry of the multiroving fiber laminator illustrated in FIG. 1.

As shown in FIG. 6, attached to a pair of adjacent horizontal support beams 113 located at the bottom of the Y-axis truss 95 on the side facing away from the X-axis truss 83 is a support plate 163. Mounted on the outer face of the support plate 163 is a housing 165. The housing 165 is formed by a back plate 167 and a front weldment 169. The front weldment 169 is mounted on the back plate and constructed such that a large cavity 171 is formed by the front weldment and the back plate. Mounted in the cavity 171 is a large diameter spur gear 173. More specifically, the front weldment 169 includes a hole 175 located on the side of the weldment remote from the plate 171 and aligned with the center of the cavity 171. Mounted in the hole 175 is an outer bearing housing 177. Mounted in the outer bearing housing 177 is an outer bearing 179. An inner bearing housing 181 is mounted in a hole 178 formed in the back plate 167 in alignment with the hole 175 formed in the front weldment 169. Mounted in the inner bearing housing 181 is an inner bearing 183. The inner and outer bearings 179 and 183 support a short shaft 185. The large spur gear 173 is affixed to the short shaft 185 by a pin 187 that passes through a hub formed on the large spur gear and the short shaft. As a result, when the large gear 173 is rotated in the manner hereinafter described, the short shaft 185 is rotated.

The short shaft 185 extends beyond the outer end of the inner bearing housing 181. Affixed to or formed in the outwardly extending end of the short shaft 185 is a spur gear 189. The spur gear 189 is positioned so that the teeth of the spur gear engage the teeth of a rack 191 attached to and lying beneath an elongate bar 193 that supports the Y-axis way 99. The longitudinal axis of the rack 191 lies parallel to the longitudinal axis of the Y-axis way 99. Extending outwardly along the edge of rack 191 that faces the housing 165 is an elongate guide 195 having a rectangular cross-sectional shape. Attached to the outer surface of the back plate 167 are a pair of guide rollers 197. One roller 197 is positioned above the guide 195 and the other is positioned below the guide. Like the X-axis guide and guide rollers, the Y-axis guide and guide rollers maintain engagement between the teeth of the Y-axis spur gear 189 and Y-axis rack 191.

Mounted on the back plate 167 of the housing 165 is a Y-axis servo motor 199. The Y-axis servo motor 199 includes a shaft that extends into the cavity 177 in the housing 165. Affixed to or formed in the end of the Y-axis servo motor shaft is a small diameter spur gear (not shown) positioned so as to engage the teeth of the large spur 173 mounted in the cavity 171 formed in the housing 165 in the manner heretofore described. As a result, when the Y-axis servo motor 199 is energized, the large spur gear 173 is rotated. Rotation of the large spur gear 173 results in rotation of the rack engaging spur gear 189 and, thus, movement along the rack 191. Since the track engaging spur gear is mounted on the Y-axis truss, the Y-axis truss is moved in the Y direction by this mechanism.

Figure 7:
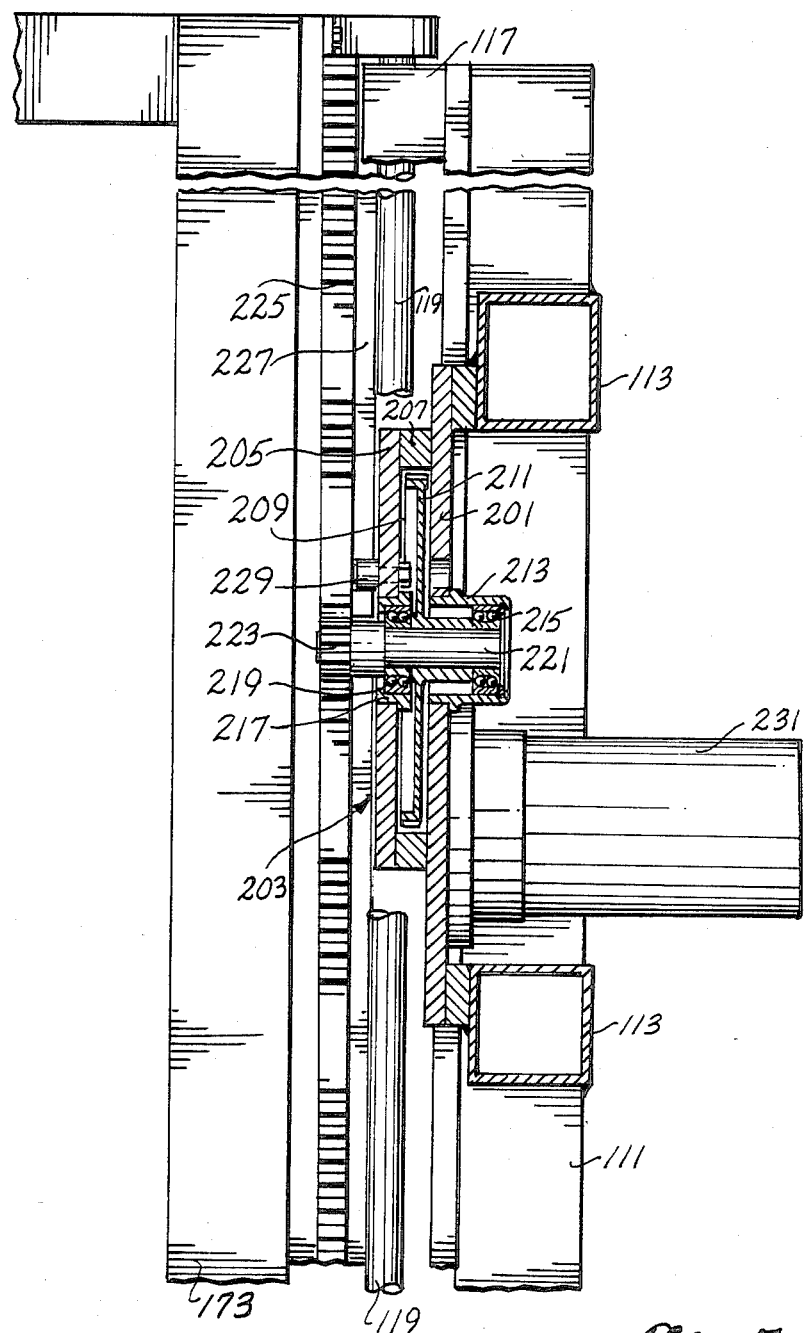
FIG. 7 is an elevational view, partially in section, of the Z-axis drive mechanism of the gantry of the multiroving fiber laminator illustrated in FIG. 1.

FIG. 7 illustrates the mechanism for moving the Z-axis truss 121 in the Z direction. Mounted on a pair of spaced-apart horizontal support beams 113 that span the front beams 111 of the Y-axis truss 95, near the top thereof, is a support plate 201. The support plate 201 forms part of a Z-axis housing 203 that also includes a front plate 205 and a spacer 207. The support plate 201, the front plate 205, and the spacer 207 define a cavity 209. Mounted in the cavity is a large diameter spur gear 211. More specifically, located in a central aperture formed in the support plate 201 is an inner bearing housing 213. Mounted in the inner bearing housing 213 is an inner bearing 215. Locating in a central aperture formed in the front plate 205, which is aligned with the central aperture in the support plate 201, is an outer bearing housing 217. Mounted in the outer bearing housing is an outer bearing 219. The inner and outer bearings 215 and 219 support a short shaft 221. The large spur gear 211 is mounted on the short shaft 221 for rotation therewith. The large spur gear 211 may be pinned to the short shaft 221, for example.

The short shaft 221 extends beyond the outer surface of the front plate 205, toward the Z-axis truss 212. Mounted on, or formed in, the outer end of the short shaft is a spur gear 223. The spur gear is positioned to engage a rack 225 that is mounted parallel to the Z-axis way 119. Extending outwardly along the edge of the rack 225 so as to lie parallel to the way 119 is an elongate guide 227. The elongate guide has a rectangular cross-sectional shape. Mounted on the front plate 205 are a pair of guide rollers 229, one lying on either side of the guide 227. As with the X and Y-axis positioning systems, the guide rollers 229 coact with the guide 227 to maintain contact between the teeth of the spur gear 223 and the teeth of the rack 225.

A Z-axis servo motor 231 is mounted on the support plate 201. The shaft of the Z-axis servo motor 231 extends into the cavity 209 of the Z-axis housing 203. Affixed to, or formed in, the end of the Z-axis servo motor shaft is a spur gear (not shown) having teeth positioned and sized to engage the teeth of the large spur gear 211 mounted in the cavity 209. As a result, when the Z-axis servo motor 231 is energized, the large spur gear 211 is rotated. Rotation of the large spur gear 211 in turn rotates the spur gear 223 that engages the rack 225. As a result, the Z-axis truss 121 is raised or lowered, depending upon the direction of rotation of the shaft of the Z-axis servo motor 231.

Figure 2:
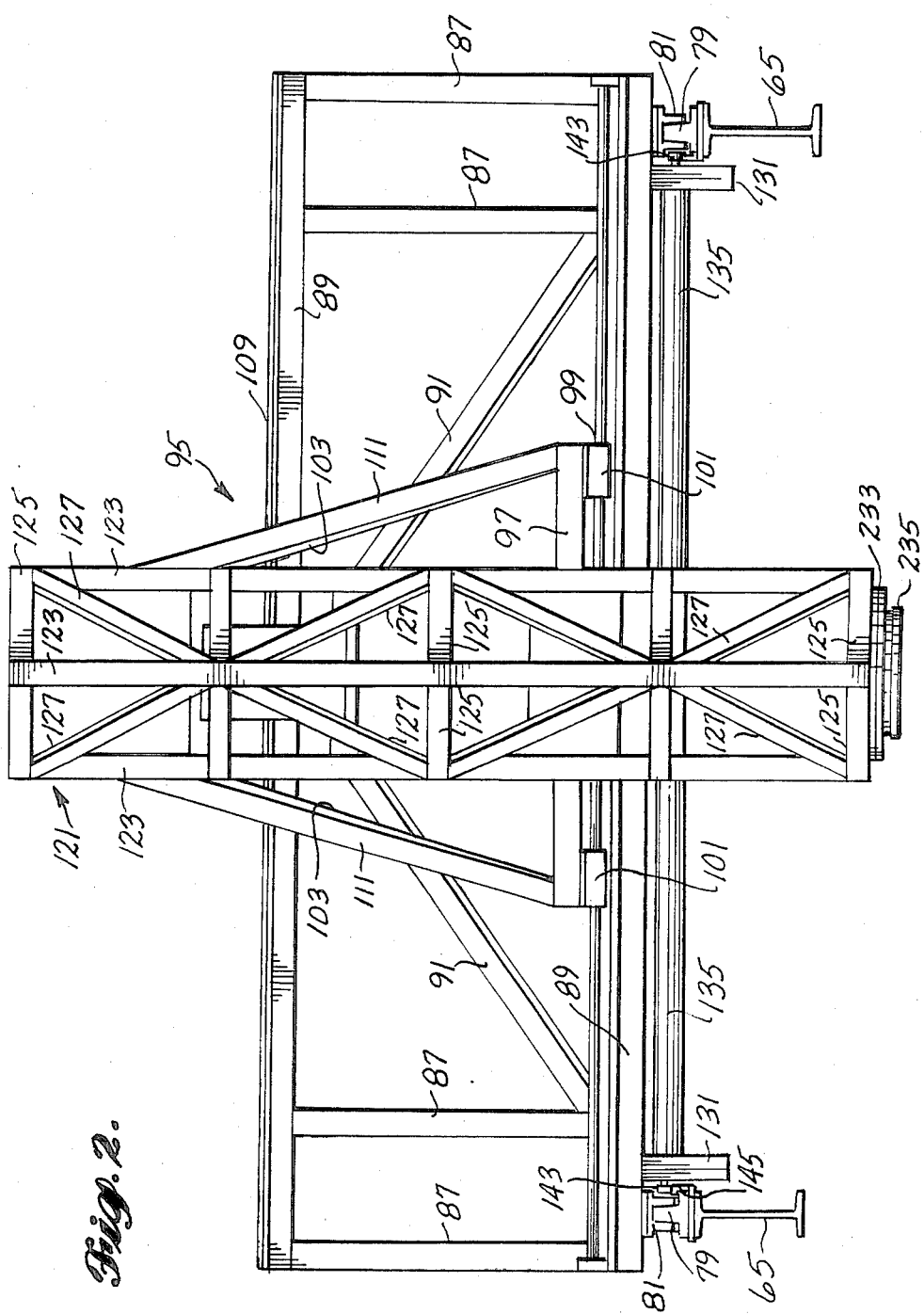
FIG. 2 is a front elevational view of the upper portion of the gantry of the multiroving fiber laminator illustrated in FIG. 1.

As shown in FIGS. 2 and 3, a horizontally oriented support plate 233 is affixed to the bottom of the Z-axis truss 121. Rotatably mounted on the support plate 233, for rotation about a vertical axis, is a large diameter spur gear 235. Mounted atop the support plate 233 is a c-axis servo motor 237. More specifically, the c-axis servo motor 237 is mounted such that the shaft of the motor is vertical and extends downwardly. Affixed to or formed in the end of the c-axis servo motor shaft is a small spur gear 239 sized and positioned such that the teeth of the small spur gear 237 engage the teeth of the large spur gear 235. As a result, when the c-axis servo motor is energized, the large spur gear 235 is rotated. The large spur gear 235 supports the fiber laminator heda 53, which is next described.

Figure 18:
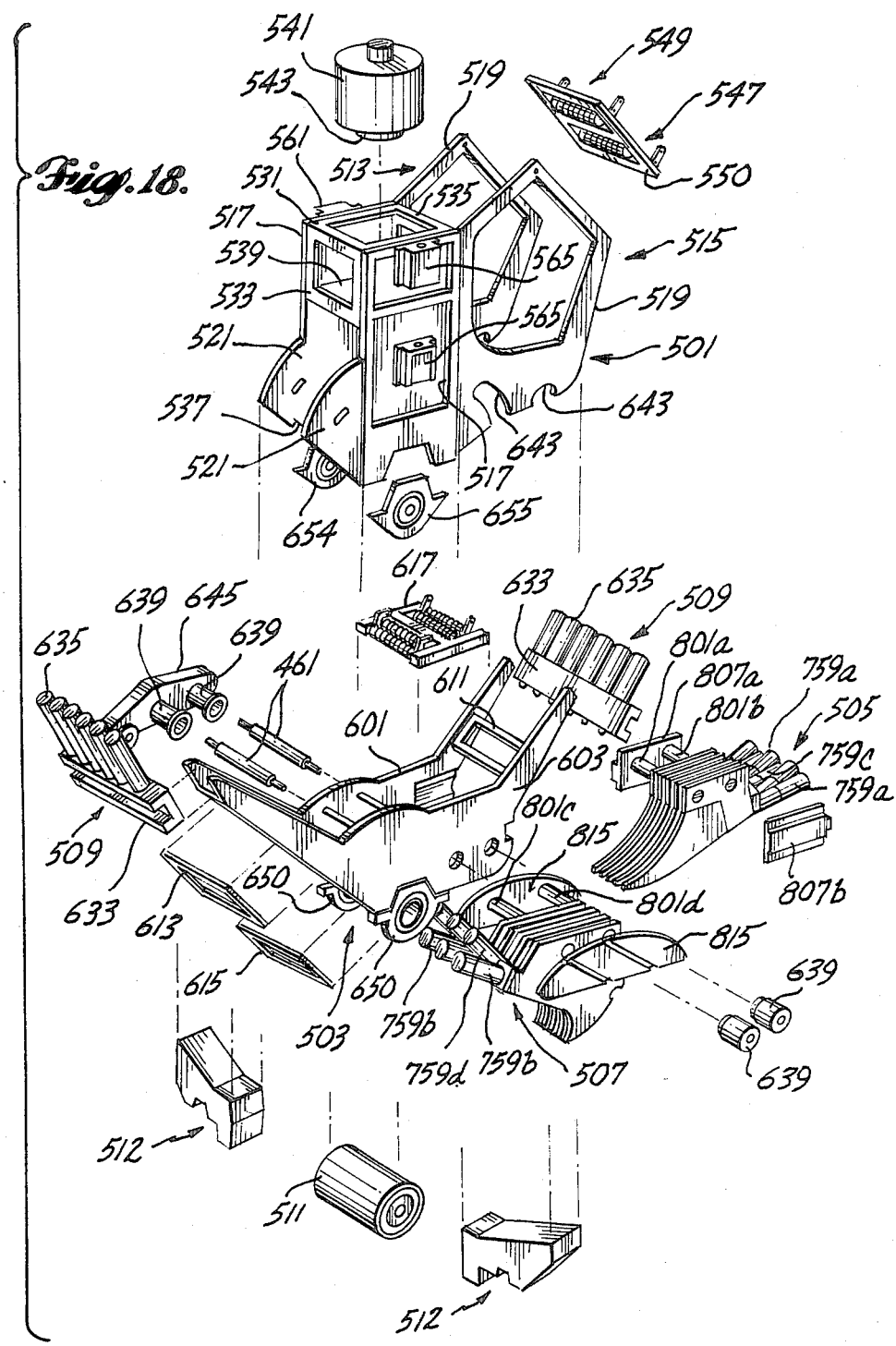
FIG. 18 is an exploded view of the main elements of a roving dispensing mechanism that forms part of the fiber laminator head of the multiroving fiber laminator illustrated in FIG. 1.

The fiber laminator head(53) includes a support structure (FIG. 8), a roving supply mechanism (FIG. 10) and a roving dispensing mechanism (FIG. 18). The support structure includes a horizontal plate 251 suitable for attachment to the large spur gear 235 rotatably attached to the base of the Z-axis truss 121. Extending downwardly from the horizontal plate 251 is a vertically-oriented, square cross section post 253. The upper end of the post 253 is rigidly attached to the cylindrical plate 251 in any suitable manner, such as by welding, for example. Preferably, gussets 255 running between the post 253 and the plate 251 are included to strengthen the junction between the post and the plate.

Mounted on the vertical post 253 is a parallelogram mechanism 254. The parallelogram mechanism 254 includes a pair of upper arms 257a and 257b located on opposed sides of the post 253 and a pair of lower arms 259a and 259b located on the same opposed sides of the post 253. The center regions of both the upper and lower pairs of arms are pivotally attached to the post 253. Attached to the outer ends of the upper arms 257a and b and lower arms 259a and b are a pair of vertical arms 261a and 261b. More specifically, one of the vertical arms 261a is attached to the outer ends of the upper and lower arms on one side of the square post 253 and the other vertical arm 261b is attached to the outer ends of the upper and lower arms on the opposite side of post 253.

Also mounted on the vertical post 253 is an a-axis servo motor 260. The shaft 262 of the a-axis servo motor 260 is coupled to one of the upper arms 257a by a suitable gear train or other coupling mechanism such that rotation of the a-axis servo motor shaft 262 rotates the arm 257a about the point where it is pivotally connected to the square post 253. Because the upper and lower arms are connected together and to the vertical arms 261a and 261b, rotation of the a-axis servo motor shaft 262 causes one of the vertical arms 261a and b to be raised and the other to be lowered. Which arm is raised and which arm is lower depends upon the direction of rotation of the shaft of the a-axis servo motor 260. In any event, the end result is movement along the a-axis path of travel illustrated in FIG. 1 and heretofore described.

Since parallelogram mechanisms of the prior art (see for example, U.S. Pat. No. 4,461,669) a detailed description of such mechanisms is not set forth here.

The vertical arms 261a and 261b extend below the lower ends of the lower arms 259a and 259b. Passing through the lower ends of the vertical arms 261a and 261b are rods 263. The axes of the rods 263 lie orthogonal to the plane in which the parallelogram mechanism 254 moves. The rods 263 support a front plate 265 and a rear plate 267. More specifically, the lower corners 269 of the front and rear plates 265 and 267 are cut out. The cut-outs include semicircular areas positioned to receive the tops of the rods 263. The bottoms of the rods are enclosed by caps 271 mounted in the notches and attached to the front and rear plates 265 and 267 by any suitable means, such as bolts, for example. Since the front and rear plates 265 and 267 are rotatably mounted on the vertical arms 261a and 261b, when the a-axis servo motor 262 moves the parallelogram mechanism back and forth in the manner heretofore described, the front and rear plates 265 and 267 are moved in the same manner. As a result, the front and rear plates move along the a-axis path-of-travel illustrated in FIG. 1 and heretofore described. The length of the various arms and the points of rotation are chosen such that rotation occurs about the point where the hereinafter described tack down roller lies normally to an underlying surface.

Figure 8:
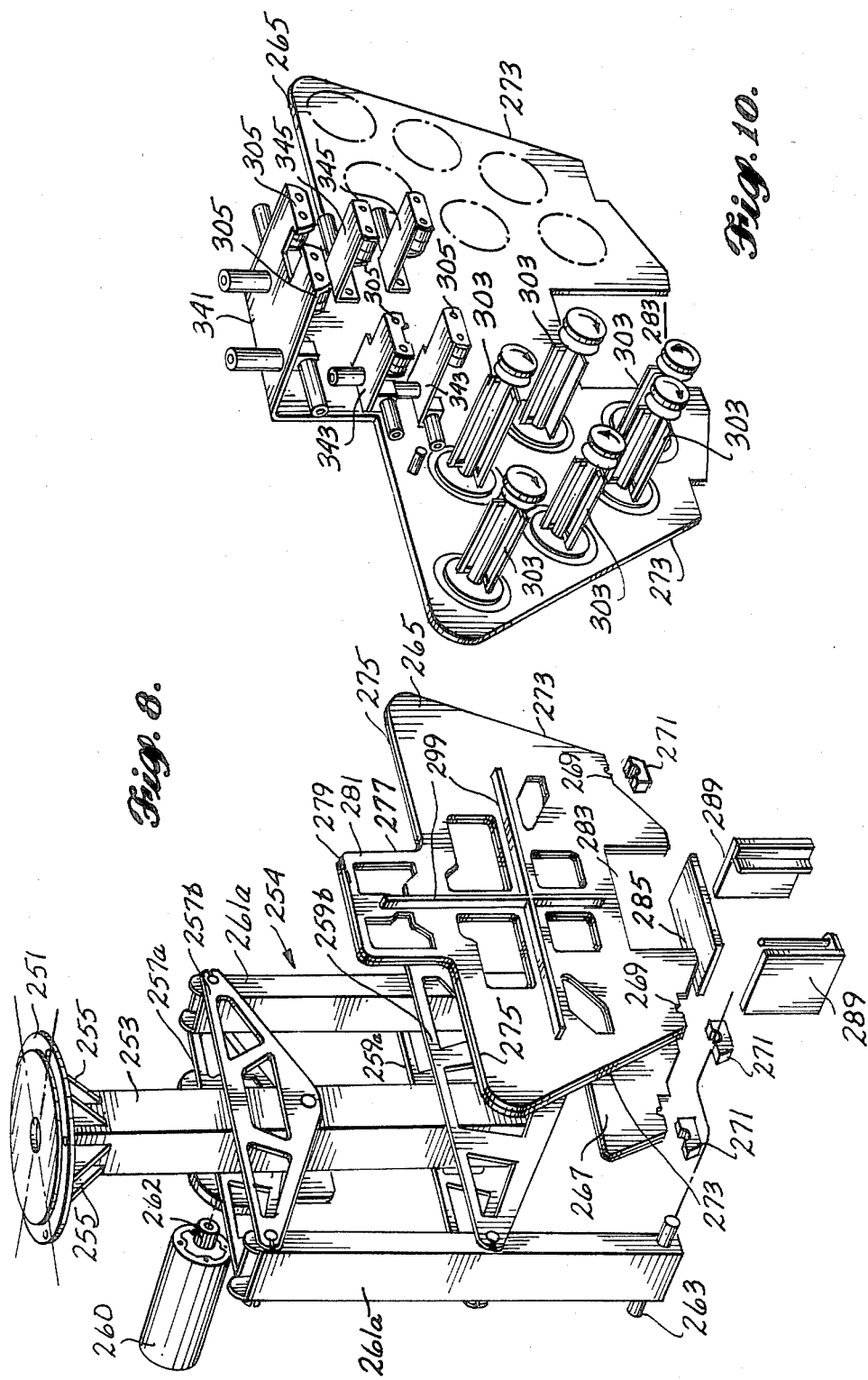
FIG. 8 is an exploded view of a support structure that forms a part of the fiber laminator head of the multiroving fiber laminator illustrated in FIG. 1.

As shown best in FIGS. 8 and 9, the front plate, which supports the roving supply mechanism illustrated in FIG. 10 and hereinafter described, has a specific shape. Specifically, the vertical edges 273 of the front plate 265 first diverge away from one another for a predetermined distance before rounding into lower top edges 275 that lie along a common axis. After proceeding toward one another for a predetermined distance, the lower top edges 275 round into vertical edges 277. After a predetermined distance, the vertical edges 277 round into a top edge 279. The end result of this structural arrangement is an upwardly projecting flange 281 formed in the top of the front plate 265.

Formed in the lower edges of both the front and rear plates 265 and 267, between the point of attachment to the rods 263, are equally-sized rectangular openings 283. An upper plate 285 is attached to the front and rear plates 265 and 267, adjacent the horizontal (top) edges of the rectangular openings 283, and spans the distance therebetween. A pair of vertical plates 287 and 289 are attached to the front and rear plates 265 and 267, adjacent the vertical (side) edges of the rectangular openings 283 and span the distance therebetween. The end results is an enclosed generally rectangular cavity that is open at the bottom and on either side. Attached to one of the vertical plates 289 is a vertically-oriented cylindrical guide rod 291. Attached to the other vertical plate 289 is a vertically-oriented rectangular guide bar 293. As will be better understood from the following description, the roving dispensing mechanism (FIG. 18) is slidably mounted on both the cylindrical guide rod 291 and the rectangular guide bar 293.

Figure 9:
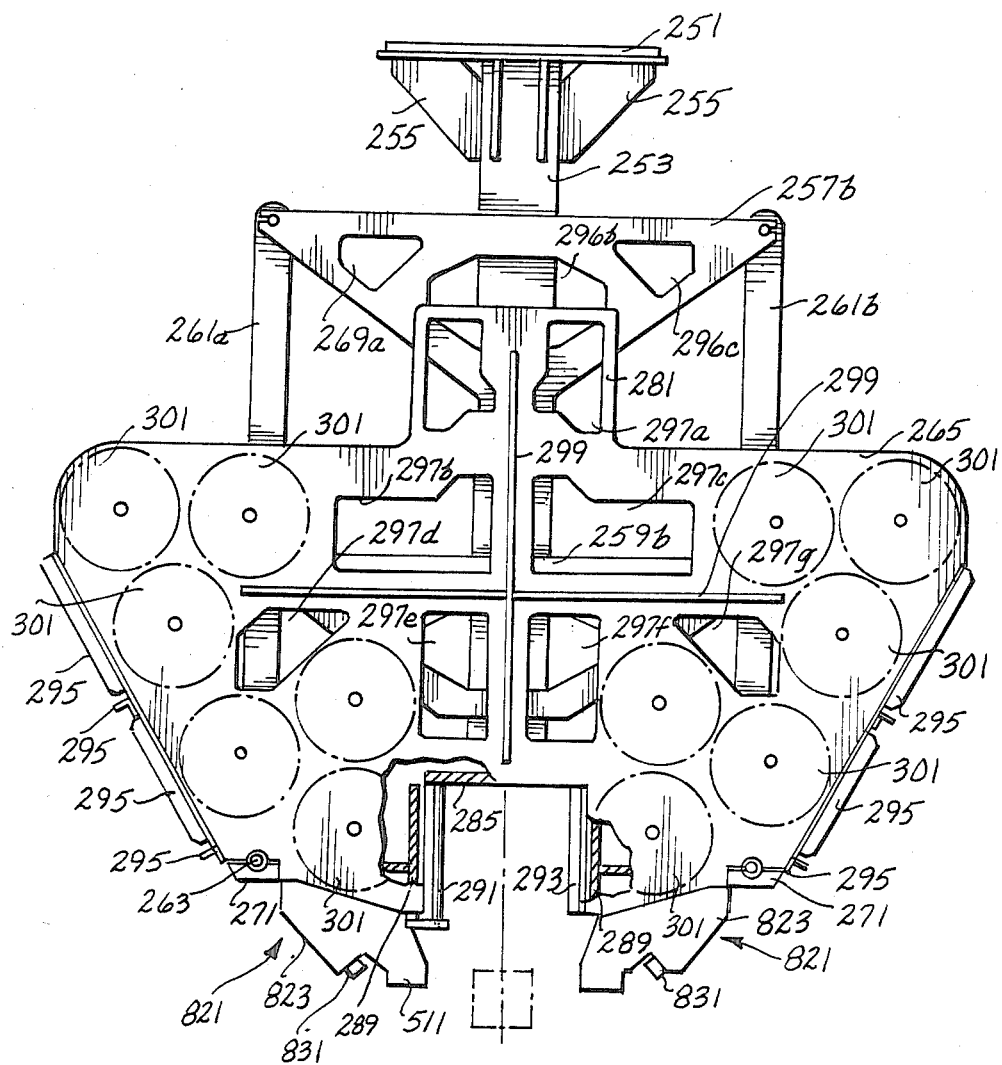
FIG. 9 is a front elevational view of the support structure illustrated in FIG. 8.

As shown in FIG. 9, preferably, spreader bars 295 are attached to the diverging vertical edges 273 of the front and rear plates 265 and 267 and span the distance therebetween. As a result of the horizontal and vertical plates 285 and 289 and the spreaders 295, the front and rear plates 265 and 267 are relatively rigidly attached to one another while being spaced from the parallelogram mechanism 254 to allow for movement along the previously described a-axis path-of-travel. Preferably, the upper and lower pairs of bars 257a and b and 259a and b are apertured 296a, 296b, etc., for weight reduction purposes. Similarly, preferably, the front plate 265 and the rear plate 267 are weight reduced. Weight reduction can be accomplished by including reducing apertures 297a, 297b, etc., at suitable locations or by milling out areas of the plates at suitable locations. Further, preferably, the front plate is reinforced by a pair of orthogonal reinforcing bars 299 rigidly affixed to the outer face of the plate. Similar reinforcing bars can be affixed to the outer face of the rear plate, if desired.

As shown in outline form in FIG. 9, the front plate 265 supports a plurality of spools of roving 301. In the illustrated embodiment of the invention, twelve spools of roving are located on the outer surface of the front plate 265, six on either side of the vertical centerline. The spools of roving 301 are actually supported by a roving supply mechanism that is mounted on the front plate 265. The rovings wound on the spools are flat and preimpregnated with a suitable epoxy resin. While rovings of various widths can be utilized, the presently preferred roving width is ¼ inch. The preferred tolerance range is from 0.220 to 0.260 inches wide.

Figure 13:
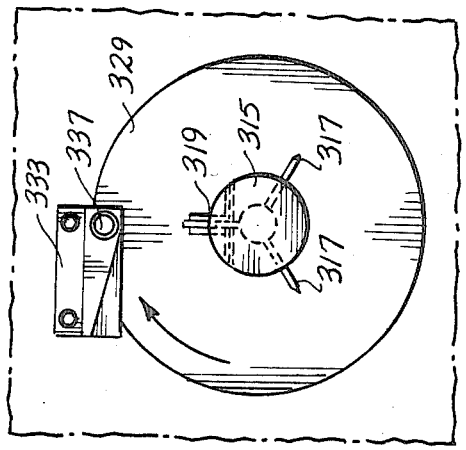
FIG. 13 is an end view of the roving spool hub and brake mechanism illustrated in FIG. 12.
Figure 12:
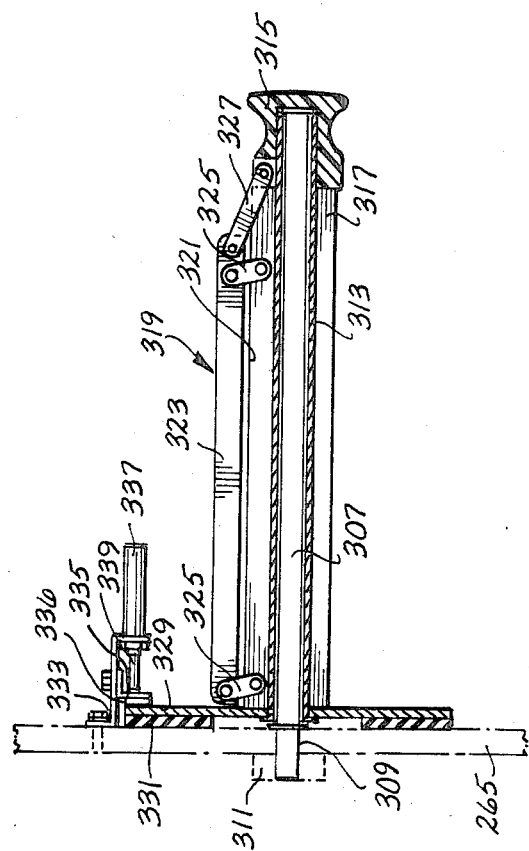
FIG. 12 is a cross-sectional view of a roving spool hub and brake mechanism suitable for use in the roving supply mechanism illustrated in FIG. 10.
Figure 14:
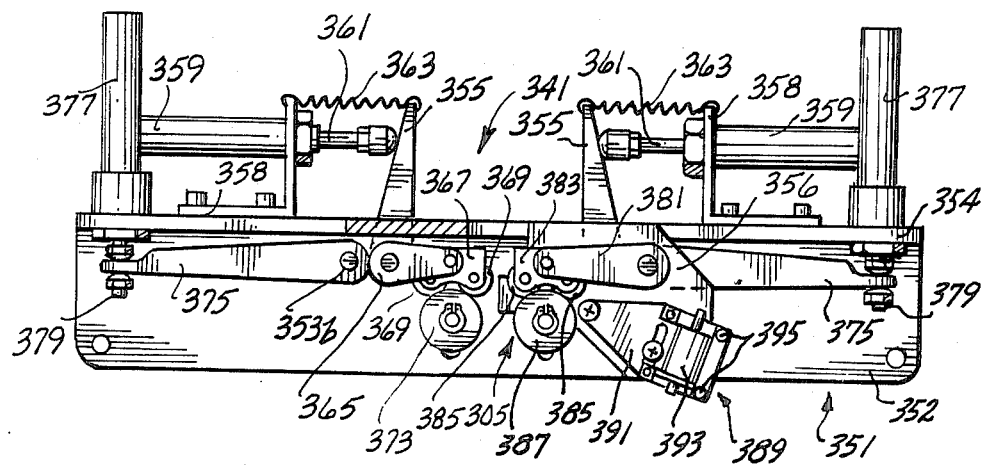
FIG. 14 is an end elevational view, partially in section, of a center nip roller assembly suitable for use in the roving supply mechanism illustrated in FIG. 10.
Figure 15:
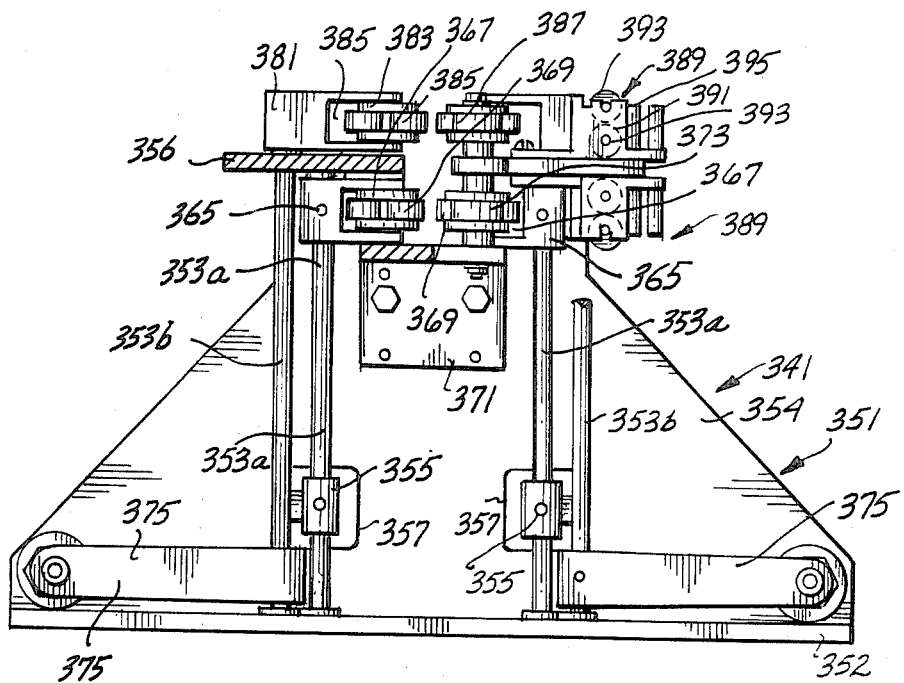
FIG. 15 is a bottom view of the center nip roller assembly illustrated in FIG. 14.
Figure 16:
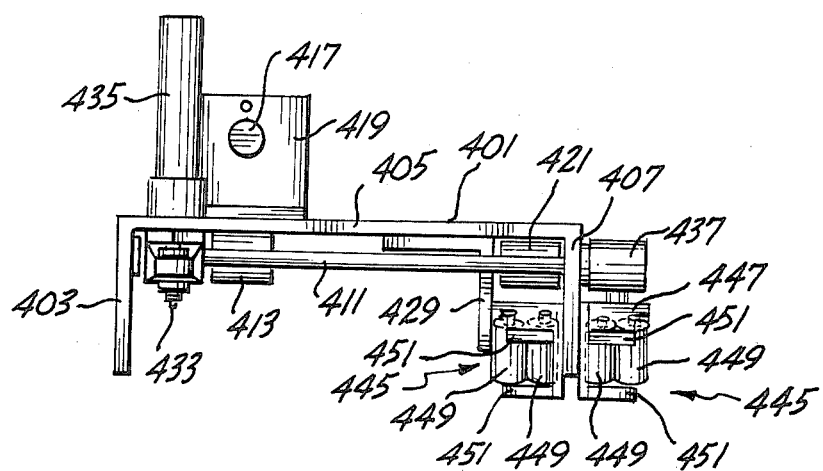
FIG. 16 is a side elevational view of a right hand nip roller assembly suitable for use in the roving supply mechanism illustrated in FIG. 10.

As illustrated in FIG. 10, the roving supply mechanism includes a plurality of hub and brake mechanisms 303, one for supporting each of the roving spools 301. The hub and brake mechanisms are illustrated in FIGS. 12 and 13 and described below. The roving supply mechanism also includes a plurality of nip roller assemblies 305, one for each roving. The nip roller assemblies are illustrated in FIGS. 14 through 16 and described below. As illustrated in FIG. 11, the nip roller assemblies 305 are all mounted in the center of the outer surface of the upper portion of the front plate 265, directly above the rectangular aperture 283 formed in the bottom of the front plate 265. As also illustrated in FIG. 11, some of the roving spools rotate clockwise and others rotate counterclockwise. After leaving their respective spools, the rovings each travel to a related nip roller assembly 305, which apply a slight pressure to the already flat rovings to maintain alignment around a 90° angle change and to remove any remaining surface irregularities. After passing through a nip roller assembly 305, the rovings follow a vertical path-of-travel down to the rectangular aperture 283. The vertical paths-of-travel of the rovings are spaced from one another. That is, the path-of-travel of each roving from its associated nip roller assembly 305 to the rectangular aperture 283 is different.

FIGS. 12 and 13 illustrate a hub and brake mechanism 303 formed in accordance with the invention. While the specific hub and brake mechanism illustrated in FIGS. 12 and 13 is designed for spool movement in the clockwise direction, it is to be understood that the same mechanism can be used for counterclockwise rotating spools. The only change needed for counterclockwise rotating spools is to reverse the brake mechanism as shown in FIG. 11.

The hub and brake mechanism 303 illustrated in FIGS. 12 and 13 includes a shaft 307 mounted in a suitably positioned hole 309 formed in the front plate 265 and affixed thereto by a suitable locking mechanism, such as a nut 311 mounted on a threaded end of the shaft 307 that extends through the hole. Rotatably mounted on the shaft 307 is cylindrical hub 313. Slidably mounted on the outer end of the cylindrical hub 313 is a knob 315. Longitudinally extending radially outwardly from the hub 313 at equal angular positions are three blades -- two single-piece blades 317 and a two-piece blade 319. The single-piece blades 317 are attached to the hub 313 along one edge. The two-piece blade 319 includes an inner piece 321 attached to the hub 313 and an outer piece 323 attached to the inner piece by a pair of links 325. The links 325 are located at opposite ends of the inner and outer pieces 321 and 323 and maintain the inner and outer pieces parallel and coplanar. A further link 327 connects the outer end of the outer piece 323 to the knob 315. When the knob 315 is moved longitudinally on the cylindrical hub 313, away from the front plate 265, the outer piece 323 is moved both outwardly and toward the inner piece. Such movement stops when the inner edge of the outer piece 323 meets the outer edge of the inner piece 321. In this position the distance between the outer edges of the outer piece 323 and the outer edges of the fixed blades 317 is at a minimum. The minimum distance is such that a spool containing fiber roving can be slid over the blades. When the knob 315 is thereafter pushed toward the front plate 265, the outer piece 323 of the two-piece blade 319 moves outwardly and creates pressure against the inside of the roving spool that causes all three blades to dig into the spool. As a result, the spool is frictionally attached to the hub and brake mechanism illustrated in FIG. 12. Preferably, the outer piece of the two-piece blade moves to the "over center" position shown in FIG. 12 as the knob is pushed toward the front plate, which results in the outer piece being locked in position when a spool is mounted on a hub 313.

Affixed to the end of the cylindrical hub 313 remote from the knob 315 is a disk 329. The disk lies orthogonal to the longitudinal axis of the cylindrical hub and is spaced from the adjacent surface of the outer plate 265. Located between the disk 329 and the front plate 265 is a brake ring 331 formed of a suitable high friction material, such as cork. The brake ring 331 is attached to the front plate 265 to an adhesive or some other suitable attachment medium.

Mounted on the front plate 265 adjacent to the edge of the disk 329 is a Z-shaped bracket 333. The Z-shaped bracket 333 is positioned such that one of its legs is attached to the front plate 265, the other leg overlies the disk 329 and the bracket web lies orthogonal to the front plate. Attached to the surface of the web of the Z-shaped bracket 333 that faces the disk is an L-shaped bracket 335. The L-shaped bracket is elongate and its point of attachment is located at one end of one leg. The other leg of the L-shaped bracket 335 overlies the outer surface of the disk 329, near the edge of the disk. Mounted on the disk facing surface of the L-shaped bracket is a pad 336. Mounted on the outer leg of the Z-shaped bracket 333 in alignment with the portion of the L-shaped bracket 335 that overlies the disk 329 is an air cylinder 337. When the air cylinder is energized, its shaft 339 impinges on the aligned portion of the L-shaped arm 335 and moves the L-shaped arm 335 toward the disk 329. As a result, pad 336 presses the disk 329 against the brake ring 331. In this way a brake force is applied to a spool mounted on the blades of the hub and brake mechanisms. As more fully described below, the brake mechanism has a two-fold purpose. First it is used to apply a small fiber despooling tension force to the roving spools to prevent the spools from free wheeling. Second, it is used to apply an immediate stop force to prevent inertia induced free wheeling when the related roving is cut and no longer to be dispensed.

Since, as noted above, the only diference between a hub and brake mechanism 303 for a couterclockwise rotating roving spool and a clockwise rotating spool (FIGS. 12 and 13) is the directional orientation of the brake mechanism mounted on the Z-shaped bracket 333, a hub and brake mechanism for a counterclockwise moving roving spool is not described herein. As also noted above, the orientation of the brake mechanisms for clockwise and counterclockwise rotating spools is illustrated in FIG. 11.

Depending upon the source of the rovings, the nip roller assemblies 305 either form part of a combo nip roller assembly 341 (FIGS. 14 and 15), a right hand nip roller assembly 343 (FIGS. 16 and 17) or a left hand nip roller assembly 345 (not shown in detail). The combo nip roller assembly 341 includes nip rollers for four rovings. Each of the two right nip roller assemblies 343 includes nip rollers for two rovings and each of the left nip roller assemblies 345 includes nip rollers for two rovings.

The combo nip roller assembly 341 includes a combo nip roller housing 351 in the form of an L-shaped bracket. One leg of the combo nip roller housing forms a flange 352 that is attached to the front plate 265. The other leg 354 extends outwardly and supports the nip rollers plus pneumatic actuators that cause the nip rollers to apply pressure to the flat rovings to remove any slight imperfections prior to the rovings being dispensed in the manner hereinafter described. More specifically, extending orthogonally outwardly from the flange 352 of the combo nip roller housing 351 on either side of the center line thereof is an inner shaft 353a and an outer shaft 353b. The outer ends of the shafts are supported by a flange 356 that extends outwardly from the outwardly extending leg 354 of the combo nip roller housing. When the combo nip roller housing is mounted on the front plate 265, the inner and outer shafts 353a and 353b underlie the outwardly extending leg 354.

Mounted on each of the inner shafts 353a is a lever arm 355 that extends orthogonally outwardly and passes through an aperture 357 formed in the outwardly extending leg 354 of the combo nip roller housing 351. Attached to the upper surface of the outwardly extending leg 354 are angle brackets 358. Each angle bracket supports a pneumatic actuator 359 positioned such that the shaft 361 of the actuator is aligned with a lever arm 355. Coil springs 363 attach the outer end of the lever arms 355 to the brackets 358, such that when the shaft 361 of an actuator 359 is extended, a related coil spring 363 is stretched.

Mounted on the outer end of each of the inner shafts 353b is a bracket 365 having a pair of outwardly extending arms between which is mounted a yoke 367. The yoke 367 supports a pair of small nip rollers 369 mounted for rotation about parallel axes that lie parallel to the axis of the inner shaft 353a.

Mounted on the outwardly extending leg 354 of the combo nip roller housing 351, between the inner shafts 353a is an L-shaped bracket 371. The L-shaped bracket 371 is positioned such that one leg extends outwardly and lies both orthogonal to the axis of the inner shafts 353a and adjacent to the small nip rollers 369. Mounted on shafts that run between the outwardly extending leg of the L-shaped bracket 371 and the flange 356 of the combo nip roler housing 351 are large nip rollers 373. A large nip roller 373 is aligned with each of the pairs of small nip rollers 369. Each large nip roller includes end flanges between which the small nip rollers 369 lie. The thickness of the flanges and nip rollers is such that the small nip rollers 369 impinge on the surface of the large nip roller 373 lying between the flanges. Each large nip roller 373 and its related pair of small nip rollers 369 form a nip roller assembly 305 for one of the rovings. When the actuators 359 associated with these nip roller assemblies are energized they force the pairs of small nip rollers against the large nip rollers. It is this force that removes small surface imperfections from the already flat rovings prior to the roving being dispensed. When the actuators are deenergized, the force created by the coil springs 363 causes the lever arms 355 to rotate the inner shafts 353a in a direction that causes the brackets 365 to rotate the yokes 367 and, thus, the small nip rollers 369 away from the large nip rollers 373. Thus, a gap is created between the small nip rollers and the large nip rollers. The gap allows a roving to be easily threaded between the nip rollers. Or, if already threaded, the gap allows a roving to be more easily rethreaded in the manner hereinafter described because the nip rollers are prevented from applying restraining force.

Mounted on the inner end of each of the outer shafts 353b, adjacent the flange 352 of the combo nip roller housing that is attached to the front plate 265, is a lever arm 375. Mounted on the outwardly extending leg 354 of the combo nip roller housing 351, in alignment with the outer ends of these lever arms 375, are actuators 377. The shaft 379 of one such actuator 377 is attached to the outer end of each of the lever arms 375. As a result, when one of the actuators 377 is energized, the actuator's shaft 379 moves the related lever arm 375. As a result, the outer shaft 353b on which the lever is mounted is rotated.

Mounted on the outer and each of the outer shafts 353b is a bracket 381 having a pair of outwardly projecting arms that support a yoke 383. The yoke in turn supports a pair of small nip rollers 385. The pair of small nip rollers 385 overlie a large nip roller 387 having a center hub and a pair of outer flanges. The large nip rollers 387 are mounted on the flange 356 that extends outwardly from the outwardly extending leg 354 of the combo nip roller housing 351. As a result, the large nip rollers 387 and the pairs of small nip rollers 385 form two additional nip roller assemblies similar to the two nip roller assemblies previously described. Since the brackets 381 are affixed to the outer shafts 353b, the pairs of small nip rollers 385 are movable toward and away from the large nip rollers 387 when the actuators 377 are energized to move the lever arm 375 in the manner previously described. Movement of the lever arm in one direction presses the pairs of small nip rollers 385 against their respective large nip rollers 387. Movement of the lever arm in the other direction creates a gap between the pairs of small nip rollers 385 and their respective large nip rollers 387.

The flanges 356 that extend outwardly from the outwardly extending leg 354 of the combo nip roller housing 351 also support deflection roller assemblies 389 such that a deflection roller assembly 389 is located between each nip roller assembly and the roving spool supplying roving to the nip roller assembly. Each deflection roller assembly 389 includes a bracket 391 that supports a pair of small cylindrical rollers 393 that are closely spaced to one another and rotate about axes that lie orthogonal to the axes of rotation of the nip roller assemblies. In addition to the pair of cylindrical rollers 393, each bracket 391 supports a pair of spaced-apart pins 395 located at the edges of the small cylindrical rollers 393 on the roving spool side of the pair of rollers 393. The axis of the pins lie orthogonal to the axes of rotation of the pair of cylindrical rollers 393. A roving leaving a spool 301 first passes between the pins 395, which maintain the roving aligned with the pair of cylindrical rollers 393 and then through the pair of cylindrical rollers. After leaving the pair of cylindrical rollers, the rovings pass through their respective nip roller assemblies. Thus, the deflection roller assemblies maintain the rovings aligned with the related nip roller assemblies as the rovings are unwound from their related spools. Both the small and large nip rollers 369, 373, 385 and 387, the cylindrical rollers 393 and the pins 395 are coated with a nonstick material. In this regard, preferably, the rollers are formed of steel. A suitable nonstick coating for steel rollers is the HMF coating applied by General Magnaplate, 2707 Palma Drive, Ventura, Calif. 93003.

Figure 17:
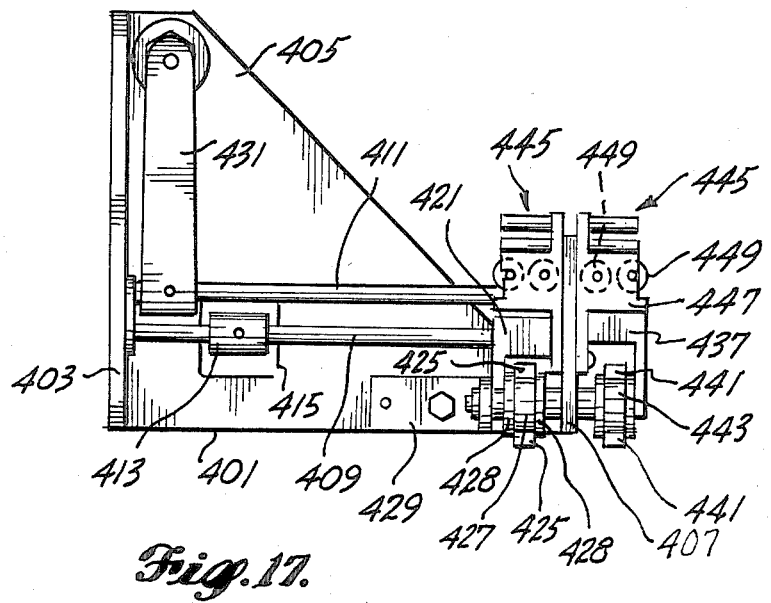
FIG. 17 is a bottom view of the right hand nip roller assembly illustrated in FIG. 16.

The left and right hand nip roller assemblies 343 and 345 are substantially identical except for being oppositely handed. As a result, only the right hand nip roller assembly is described here. As shown in FIGS. 16 and 17, each right hand nip roller assembly includes a right nip roller housing 401 having an inner flange 403 suitable for attachment to the outer face of the front plate 265. The right nip roller housing 401 also includes an outwardly projecting leg 405 and an outer flange 407 that lies parallel to the inner flange 403. Extending between the inner and outer flanges 403 and 407 are inner and outer shafts 409 and 411. Attached to the inner shaft 409 is a lever arm 413 that extends outwardly through an aperture 415 formed in the outwardly projecting leg 405 of the right nip roller housing 401. The outer end of the arm 413 impinges on the outer tip of the shaft of an actuator 417 mounted on an angle bracket 419 that, in turn, is mounted on the outwardly projecting leg 405 of the right nip roller housing 401. In addition, the outer end of the lever arm 413 is connected to the bracket 419 by a coil spring (not shown) in the same way the coil spring 363 of the combo nip roller assembly connects the lever arm 355 that passes through the combo nip roller housing 351 to an angle bracket 358. As a result, when the actuator 417 is deenergized, the coil spring pulls the lever arm 413 toward the angle bracket 419 resulting in the inner shaft 409 rotating in one direction. When the actuator is energized, the lever arm is pushed away from the angle bracket, resulting in the inner shaft rotating in the opposite direction.

Mounted on the outer end of the inner shaft 409 is a bracket 421 having a pair of outwardly extending arms that support a yoke (not shown). The yoke, in turn, supports a pair of small nip rollers 425. The small nip rollers 425 are mounted in alignment with a large nip roller 427 having a pair of outer flanges 428. The large nip roller 427 is mounted on a shaft that is mounted between the outer flange 407 of the right nip roller housing 401 and an angle bracket 429 mounted on the outwardly projecting leg 405 of the right nip roller housing 401. As a result, when the inner shaft 409 is rotated as a result of the energization and deenergization of the actuator 417, the bracket 421 rotates the yoke. Thus, like with the combo nip roller assembly, the small nip rollers 425 are moved toward and away from the large nip roller 427. When the actuator 417 is energized, the small nip rollers 425 are pressed against the large nip roller 427 with a force adequate to remove slight imperfections from the already flat rovings. When the actuator is deenergized, a slight gap occurs between the small nip roller 425 and the large nip roller 427 to allow rovings to be easily threaded therebetween.

Mounted on the outer shaft 411 of the right hand nip roller assembly illustrated in FIGS. 16 and 17 is a lever arm 431 whose outer end is aligned with the shaft 433 of an actuator 435 mounted on the outwardly projecting leg 405 of the right nip roller housing 401. As a result, when the actuator 435 is energized, the lever arm 431 is moved and the outer shaft 411 rotated. Mounted on the outer end of the outer shaft 411 is a bracket 437 having a pair of outwardly extending arms that support a yoke. The yoke in turn supports a pair of small nip rollers 441. The small nip rollers 441 are aligned with a large nip roller 443, having a pair of outer flanges 44. The large nip roller 443 is mounted on the outer face of the outer flange 407 of the right nip roller housing 401. As a result, when the actuator 435 is energized to rotate the outer shaft 411 in one direction or the other, the small nip rollers 441 are moved toward or away from the large nip roller 443. As with the other nip roller assemblies, when the actuator 435 moves the small nip rollers 441 toward the large nip roller 443, the small nip rollers are pressed against the large nip roller with a force adequate to remove slight imperfections from the flat roving passing therebetween. When the actuator 435 moves the small nip rollers 441 away from the large nip roller 443 the flattening force is eliminated.

Also mounted on the outer flange 407 of the right nip roller housing 401 are a pair of deflection roller assemblies 445 similar to the deflection roller assemblies mounted on the combo nip roller housing 351 illustrated in FIGS. 14 and 15 and heretofore described. More specifically, the deflection roller assemblies 445 mounted on the right nip roller housing 401 each include a bracket 447 that supports a pair of cylindrical rollers 449 having rotational axes that lie orthogonal to the rotational axes of an associated set of nip rollers. Mounted on each bracket 447 adjacent to the outer corners of the cylindrical rollers 449 are a pair of pins 451. As with the deflection roller assemblies illustrated in FIGS. 14 and 15 and heretofore described, the deflection roller assemblies 445 illustrated in FIGS. 16 and 17 maintain rovings received from an associated roving spool 301 in alignment with a related set of pinch rollers. Both the small and large nip rollers 425, 427, 441 and 443, the cylindrical rollers 449 and the pins 451 are coated with a layer of nonstick material.

FIG. 18 is an exploded view of the major elements of a roving dispensing mechanism suitable for use in the fiber laminator head 53 of the multiroving fiber laminator shown in FIG. 1. The roving dispensing mechanism illustrated in FIG. 18 includes: a main frame 501; a subframe 503; a plurality of forward fiber control modules 505; a plurality of rear fiber control modules 507, a plurality of rethread actuators 509; a tack down roller 511; a laser camera 512; and, various other components that are hereinafter described.

Figure 19:
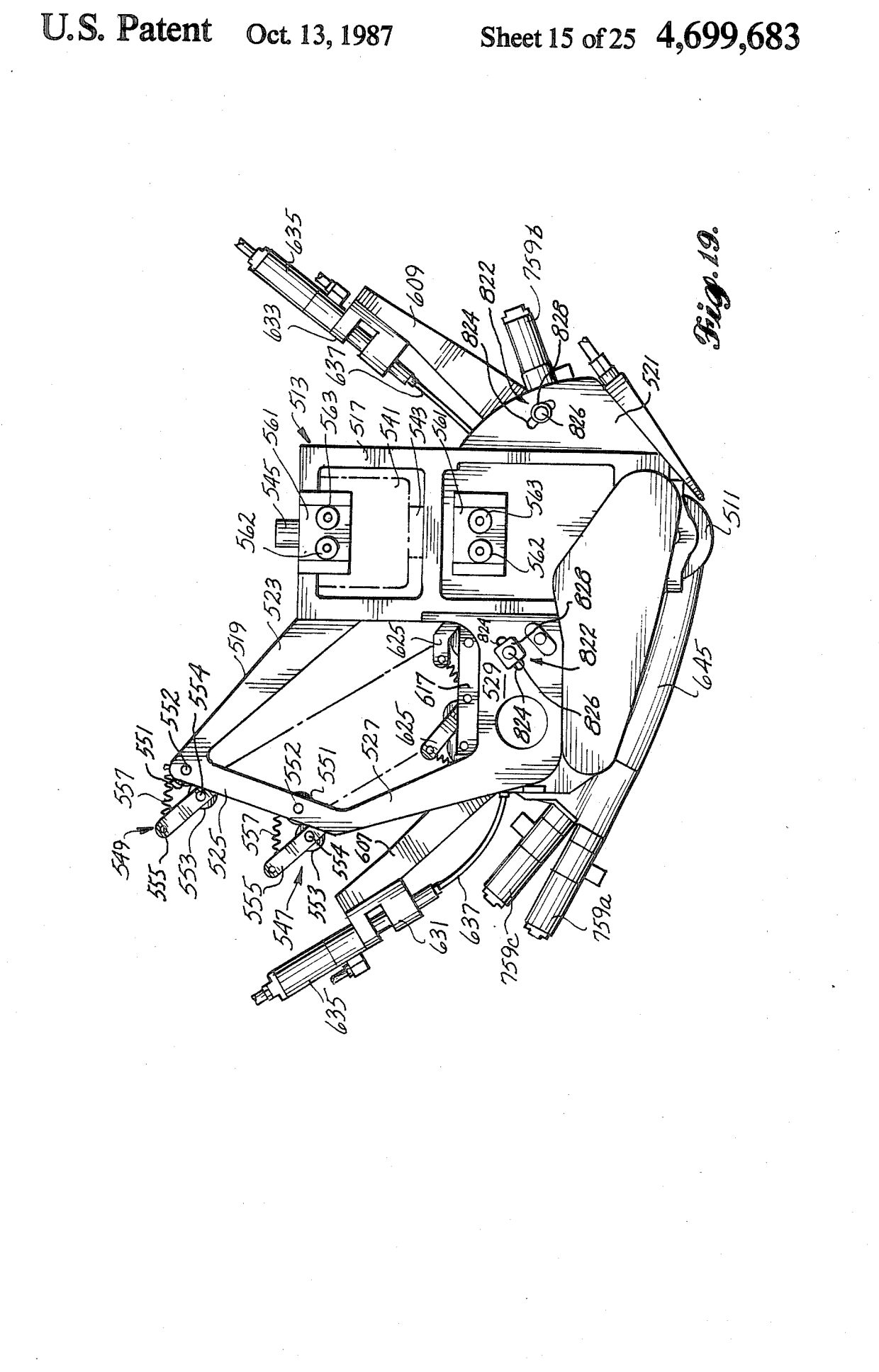
Figure 20:
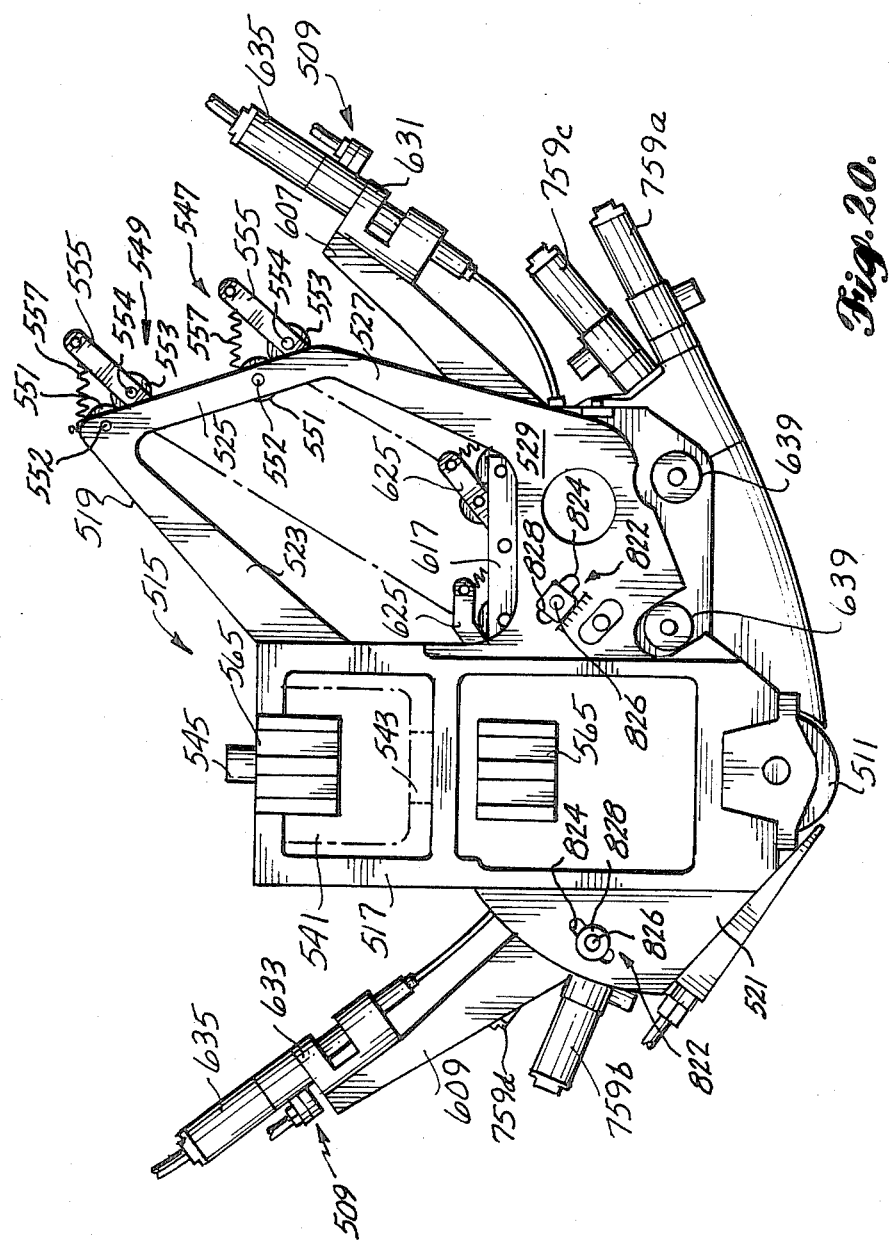
FIG. 20 is an elevational view of the other side of the roving dispensing mechanism illustrated in FIG. 18.

The main frame 501 includes a right plate 513 (FIG. 19) and a left plate 515 (FIG. 20). The right and left plates 513 and 515 have a substantially identical silhouette. Each plate includes a flat, generally rectangular body 517, an upwardly inclined apertured flange 519, and a wedge flange 521 all lying in substantially the same plane. The upwardly inclined apertured flange 519 includes an inclined upper leg 523 (FIGS. 19 and 20) that begins at an upper corner of the rectangular body 517 and inclines outwardly therefrom in an upward direction when the main frame 501 is mounted in the support structure illustrated in FIG. 8 in the manner hereinafter described. The upwardly inclined leg 523 merges into an outer leg 525 that extends downwardly from the upwardly inclined leg and in a direction that diverges slightly away from the rectangular body 517. The outer leg 525 merges into a lower leg 527 that slightly converges toward the rectangular body 517. The lower leg 527 merges into a relatively wide bottom leg 529 that lies orthogonal to the rectangular body 517. The bottom leg 529 terminates at the rectangular body 517. The wedge flange 521 extends outwardly from the edge of the rectangular body 517 opposed to the edge from which the upwardly inclined apertured flange 519 extends. The wedge flange 521 includes an arcuately-shaped upper edge and a relatively straight lower edge. The wedge flange 521 is located near the bottom of the edge of the rectangular body 517 from which the wedge flange projects.

The right and left plates 513 and 515 are held in mirror positions by a plurality of bracing cross frames. More specifically, as shown in FIG. 18, transversely mounted between the upper edges of the rectangular bodies 517 of the right and left plates 513 and 515 is a horizontally-oriented upper cross frame 531. Vertically mounted beneath and on either side of the upper cross frame, between the right and left plates 513 and 515, are side cross frames 533 and 535. Mounted between the lower edges of the wedge frames 521 is a lower cross frame 537. In addition to the cross frames, a plate 539 is mounted between the right and left main frames 513 and 515 at the base of the side cross frames 533 and 535. As a result, the upper cross frame 531, the side cross frames 533 and 535 and the plate 539 form a cubical. Mounted in the cubical is an air insulator cushion 541 having upper and lower protrusions 543 and 545. The lower protrusion 543 presses against the plate 539 and the upper protrusion 545 presses against the upper plate 285 of the support structure illustrated in FIG. 8 when the main frame 501 is mounted in the support structure in the manner hereinafter described. As will be better understood from the following description, the air insulator cushion is provided to create a force that results in the tack down roller applying a substantially constant pressure against rovings as they are being dispensed over a small range of underlying tool and/or composite layer elevation changes.

Mounted between the outer legs 525 of the upwardly inclined apertured flange 519 near the lower leg 527 is an upper forward guide roller assembly 547. Mounted between the outer legs 525 of the upwardly inclined apertured flanges 519 near the upper leg 523 is an upper rear guide roller assembly 549. The upper forward and rear guide roller assemblies 547 and 549 are mounted in a frame 550 that is attached to the outer legs 525 of the upwardly inclined apertured flanges 519 so as to span the distance therebetween. Each of the upper forward and rear guide roller assemblies includes a purality of first rollers 551 mounted on a shaft 552 mounted in the frame. The shafts are positioned crosswise between the upwardly inclined apertured flanges 519. The upper forward and rear guide roller assemblies 547 and 549 also include second rollers 553 mounted on a shaft 554 that is mounted on a yoke 555. The yoke 555, in turn, is rotatably attached to the frame 550. The shaft 554 and, thus, the second rollers 553 lie crosswise between the inclined apertured flanges, beneath and to the outside of the first rollers. The number of first and second rollers of each of the upper forward and rear guide roller assemblies equals one-half of the number of roving spools -- six in the illustrated embodiment of the invention. Each of the first rollers is aligned with one of the second rollers 553. The first rollers have flanges between which the second rollers lie. Each aligned pair of first and second rollers forms a set of guide rollers. All of the guide rollers are coated in the layer of nonstick material. The guide roller gap is adjusted to hold or lock the rovings in position. No compaction or smoothing force is applied to the rovings by the guide roller assemblies.

All of the first and second roller are mounted for independent rotation. Thus, roving can be moved through the sets of guide rollers at different rates. A coil spring 557 associated with each of the yokes 555 pulls the yoke and, thus, the second rollers 553 toward the first rollers 551 mounted on the shaft 552 mounted in the frame 550. The width of the gap therebetween is set by an adjustable set screw (not shown). During the initial threading of the dispensing mechanism the yokes are rotated against the force of the coil springs to enlarge the gaps between the aligned pairs of first and second rollers.

Mounted on the outer frame of the rectangular body 517 of the right plate 513 (FIG. 19) are two vertically spaced-apart bearing support blocks 561. Each of the bearing support blocks supports a pair of cam follower bearings 562 -- one an adjustable position bearing and the other a fixed position bearing. The bearings are horizontally spaced apart by a distance equal to the width of the guide bar 293 mounted on one of the walls 289 that defines the rectangular cavity located at the bottom of the support structure illustrated in FIG. 8 and heretfore described. Mounted on the outer face of the rectangular body 517 of the left plate 515 (FIG. 20) are two vertically spaced-apart pillow blocks 565. The pillow blocks 565 each include a vertical aperture sized to receive the guide rod 291 mounted on the other wall 289 that defines the rectangular cavity in the supply structure 255 illustrated in FIG. 8. The bearings 562 and the pillow blocks 565 are formed and positioned such that they can be slidably mounted on the guide bar 293 and the guide rod 291. When so mounted, the upwardly inclined apertured flanges 519 of the right and left plates 513 and 515 are positioned such that the upper forward and rear guide roller assemblies 547 and 549 underlie the nip roller assemblies mounted in the combo and the right and left nip roller housings of the roving supply mechanism illustrated in FIG. 10.

The subframe 503 includes a right subframe plate 601 and a left subframe plate 603. The right and left subframe plates 601 and 603 have similar silhouettes. Each subframe plate includes a body 605, a forward arm 607, and a rear arm 609. The forward and rear arms are coplanar with the body 605 and extend outwardly from either end thereof in diverging directions. As shown in FIG. 18, the right and left subframe plates 601 and 603 are held in mirror image, spaced-apart positions by three subframe cross braces. One subframe cross brace 611 is mounted between the forward arms 607, a second subframe cross brace 613 is mounted between the rear arms 609 and a third subframe cross brace 615 is mounted across the rear edge of the bodies 605 of the right and left subframe plates 601 and 603.

Mounted atop the body 605 of the right and left subframe plates 601 and 603 and spanning the space therebetween is a subframe guide roller frame 617. More specifically, the guide frame 617 is mounted atop the upper edge of the bodies 605 of the right and left subframe plates in the region where the bodies 605 join the forward legs 607. The subframe guide roller frame 617 has an H shape when viewed from above (FIG. 18) and supports a lower forward guide roller assembly 610 and a lower rear guide roller assembly 621. Each lower guide roller assembly includes a plurality of first guide rollers 623 rotatably mounted on a shaft 624 that spans the frame 617 transverse to the plane of the right and left subframe plates 601 and 603. The first guide rollers have flanged edges. Each lower guide roller assembly 619 and 621 also includes a yoke 625 that supports a shaft 626 on which a plurality of second guide rollers 627 are rotatably mounted. The yoke shaft also lies transverse to the right and left subframe plates 601 and 603. Each of said second guide rollers 628 is aligned with a related one of said first guide rollers. Further, all of the rollers are independently rotatable. Coil springs 629 load the yoke 625 in the direction that presses the second guide rollers 627 toward the first guide rollers 623. The gap or space between the rollers is adjustable. The gap is set to maintain the roving fibers in the peripheral groove formed by the flanged rollers. A set of first and second guide rollers is provided for each roving to be supplied to the roving modules in the manner hereinafter described. As a result, a set of lower guide rollers is provided for each set of upper guide rollers. As with the upper guide rollers, all of the lower guide rollers are coated with a layer of nonstick material.

Mounted on the leading edge of the forward leg 607 of the right and left subframe plates 601 and 603 and spanning the distance therebetween is a forward module rethread cylinder mounting block 631. Mounted on the leading edge of the rear legs 609 of the right and left subframe plates 601 and 603 and spanning the space therebetween is a rear module rethread cylinder mounting block 633. The forward and rear module rethread cylinder mounting blocks 631 and 633 each support a plurality of pneumatic rethread actuators 635. A rethread actuator 635 is provided for each of the hereinafter described rethread modules. The piston of each rethread actuator 635 is connected to its related module by a sheathed cable 637 and operates the rethread mechanism of the module in the manner described below.

Mounted in pairs of aligned threaded holes formed in the right and left subframe plates 601 and 603 are two pairs of removable shaft mounts 639. See FIG. 24. Each pair of removable shaft mounts 639 supports a rethread shaft 641 that passes through the rethreading modules illustrated in FIGS. 25 and 27 and described below. The rethread modules are not illustrated in FIG. 24 so that the rethread shaft mounting mechanism can be more readily seen. The removable shaft mounts 639 extend beyond the outer surfaces of the right and left subframe plates and are positioned so as to be slidable into slots 643 formed in the wide bottom leg 529 of the upwardly inclined apertured flange 519 of the right and left plates 513 and 515 of the main frame 501.

Mounted on the right subframe plate 601 is a gear box housing 645. The gear box housing houses a pair of short shafts 646, one aligned with each rethread shaft 641. When the rethread shafts are mounted in the subframe plates, the ends of the rethread shafts are coupled to the ends of the short shafts 646 by any suitable mechanism, such as a cross-shaft key and key way, for example. Mounted on each of the short shafts 646 is a sprocket 647.

Mounted on the outer end of the shaft 649 on which the tack down roller 511 is mounted, adjacent to the gear housing 645, is a spur gear 651. The spur gear 651 is positioned so as to interact with a spur gear 653 mounted on the end of a shaft 655 that, in turn, is mounted in bearings 657 located in opposing walls of the gear box housing 645. The shaft is mounted such that its axis lies parallel to the axes of the short shafts 646. Mounted on the shaft 655 that is gear coupled to the tack down roller shaft 649 are a pair of drive sprockets 659. One drive sprocket 659 is aligned with each of the sprockets 647 mounted on the short shafts 646. A short, continuous chain 661 and 663 connects each of the drive sprockets 659 with the aligned sprocket mounted on one of the short shafts 646. Tensioning rollers 665, mounted in the gear box housing 645 and on arms 657 attached to position adjustable brackets 659, are positioned to apply pressure to the chains to create and maintain chain tension.

As will be appreciated from the foregoing description, when the tack down roller 511 is rotated as a result of movement of the fiber laminator head in the manner herein described, the rethread shafts 641 are rotated. More specifically, when the tack down roller rotates, the spur gear mounted on the end of the tack down roller shaft 649 rotates the spur gear 653 mounted on the shaft 655, which, in turn, rotates the chains. As a result the rethread shafts 641 are rotated. Thus, the rethread shafts are rotated whenever the tack down roller 511 is rotated. The gearing and sprocket sizes are chosen such that the peripheral speed of the rethread shafts is the same as the peripheral speed of the tack down roller 511.

Figure 27:
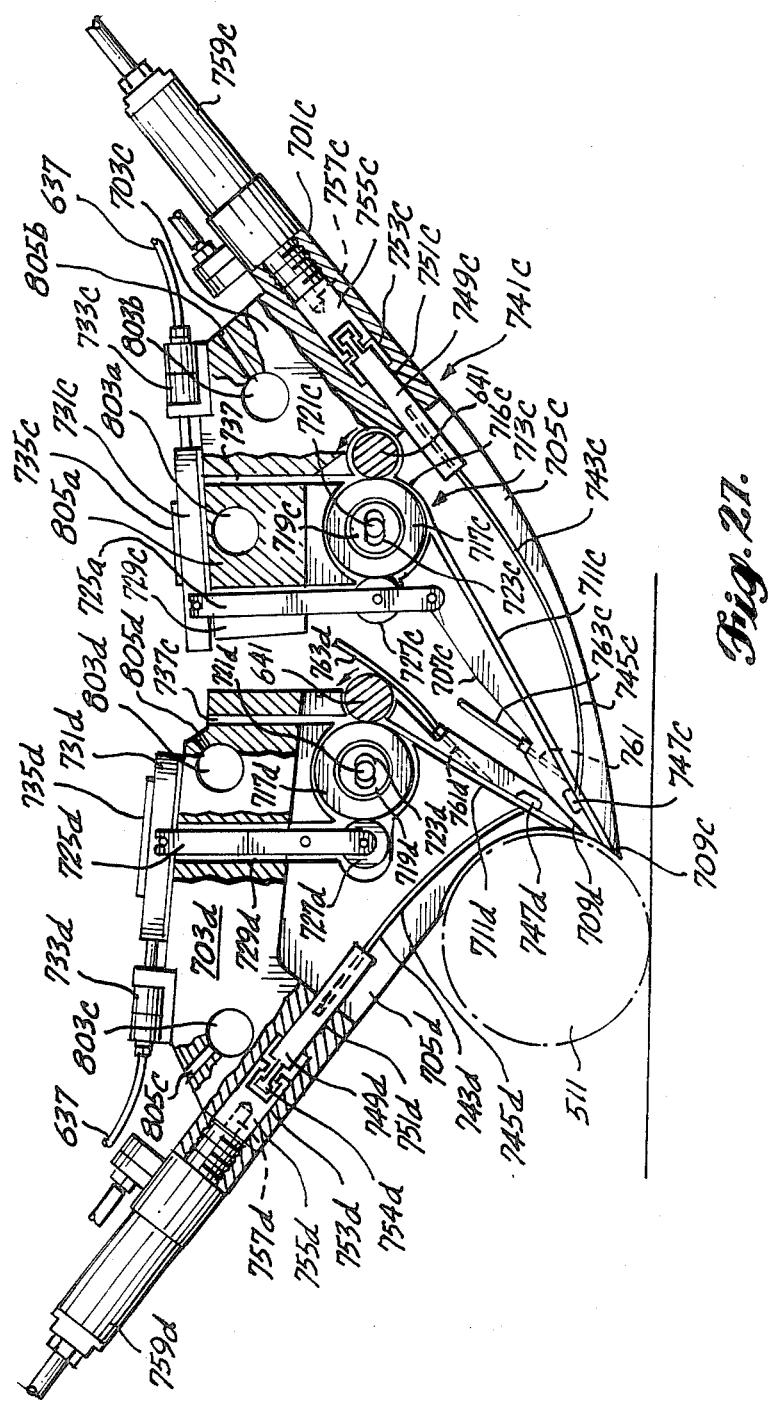
FIG. 27 is a cross-sectional view, partially in section, of a net of upper roving dispensing modules suitable for mounting in the subframe illustrated in FIGS. 22–24.

The subframe 503 houses a plurality of modules each designed to dispense a single roving. While the modules have different peripheral shapes, each module contains the same mechanisms. As will be better understood from the following description, each module includes a rethread mechanism 713 and a shear mechanism 741. For purposes of definition the modules are defined as lower forward modules, lower rear modules, upper forward modules, and upper rear modules. The lower forward and rear modules are illustrated in FIG. 25 and, the upper forward and rear modules are illustrated in FIG. 27. Since the illustrated embodiment of the invention is designed to distribute twelve rovings, three modules of each of the four types are included in the illustrated embodiment. It is to be understood, of course, that a greater or lesser number of modules could be utilized in other embodiments of the invention and/or some types of modules could be eliminated entirely, depending upon the number of rovings to be dispensed.

Each of the modules include a housing 701a-d. The housings are formed of a flat sheet of metal, preferably aluminum, machined so as to have a plurality of cavities and holes positioned to receive various elements described below. Each of the housings 701a-d includes a main body 703a-d having an undercut region 705a-d. The undercut regions 705a-d are normally covered by a plate, which is not shown in FIGS. 25 and 26 so that the cavities in the undercut regions can be better viewed. When the undercut regions 705a-d are covered by their respective cover plates, the outer surfaces of the cover plates lie coplanar with the adjacent surfaces of the nonundercut portions of the main body.

In the case of the forward housings 701a and c of the lower and upper forward modules, the undercut regions 705a and 705c are located in an outwardly extending protrusion that tapers to a point 709a and c. When the forward housings are mounted in the subframe 503, the tip 709 lies immediately in front of the tack down roller 511 in the direction of roller movement.

Formed in the undercut region 705a and c of each of the forward housings 701a and c is an inclined slot 711a and c. The inclined slot extends from the tip 709a and c of the undercut region 705a and c to a rethread mechanism 713a and c. The rethread mechanism includes a hole 715a and c sized and positioned to receive one of the rethread shafts 641 described above. Mounted in a cavity 716a and c located in front of the rethread shaft hole 715a and c is a rethread roller 717a and c. Each rethread roller 717a and c is mounted on a roller bearing 719a and c that, in turn, is mounted on an axle 721a and c. The ends of the axles are mounted in elongated slots 723a and c. The elongated slots 723a and c are formed in the side wall of the cavities 716a and c that receive the rethread rollers 717a and c, and in the cover plate. The longitudinal axis of slots lie along a radius of the axis of rotation of the retread shaft 641. When the forward housings are mounted in the subframe 503 in the manner herein described this radius is generally horizontally oriented.

Located on the opposite side of each rethread roller 717a and c from the rethread shaft 641 is a rethread lever arm 725a and c. The lower end of each rethread lever arm is pinned to the forward housing 701a and c in the undercut region 705a and c at a point above the inclined slot 711a and c, beneath and behind the cavity 716a and c within which the related rethread roller 717a and c is mounted. The rethread lever arms 725a and c extend vertically upwardly when the forward modules are mounted in the subframe 503 in the manner herein described. Mounted on each rethread lever arm 725a and c is an idler roller 727a and c. The idler rollers 727a and c lie along the longitudinal axis of the slots 723a and c that receive the axle 721a and c which the related rethread roller is mounted. As a result, when a rethread lever arm 725a and c is moved in the direction of a rethread roller 717a and c, the rethread roller 717a and c is pushed toward the hole 715a and c through which the rethread shaft 641 passes. As with the other rollers that impinge on the rovings, the rethread rollers are coated with a layer of nonstick material. The rethread shaft is also coated with a low stick material. Preferably the rethread shaft is cast with a coating of a silicon rubber having high drive friction and low stick characteristics such as an A60 Duro silicon rubber.

The upper region of each rethread level link 725a and c resides in a slot 729a and c formed in the main body 703a and c of each forward housing 701a and c. The upper end of each rethread level arm 725a and c is rotatably attached to one end of a related slide link 731a and c. The other end of the slide links 731a and c are attached to the end of the sheathed cable 637 running to a related one of the rethread actuators 635 by a connector 733a and c mounted on the main body 703a and c. As a result of this arrangement, when an appropriate one of the rethread actuators is suitably energized, the related rethread lever arm 725a or c is pulled toward the related rethread roller 717a or c resulting in the rethread roller being pulled toward the hole 715a or c through which the rethread shaft 641 passes. Located above each of the slide links 731a and c is a slide retainer plate 735a and c.

Extending upwardly from the junction between each rethread roller cavity 716a and c and the hole 715a and c that receives the rethread shaft 641 is a vertical channel 737a and c. Since the upper end of each of the inclined channels 711a and c terminates at the cavity 716a and c that receives the rethread roller 717a and c, the inclined and vertical channels 711a and c and 737a and c are connected by these cavities.

Threading is accomplished by manually inserting a roving into a vertical channel 737a and c until it reaches the junction between the related rethread roller 717a or c and the rethread shaft 641. Thereafter, the related rethread actuator is energized to pull the slide link 731a or c toward the connected 733a or c. This action results in the rethread lever arm 725a or c pressing the idler roller 727a or c against the rethread roller 71a or c. This force causes the rethread roller 717a and c to press the roving against the rethread shaft 641. If the fiber laminator head is moving, as previously described, the rethread shaft is rotating. The rotation of the rethread shaft pushes the roving into the inclined channel 711a or c. The roving is pushed down the inclined channel until it exits the lower end thereof whereat it is pressed by the tack down roller 511 against an underlying surface. After threading is complete, the rethread actuator is deenergized, allowing the rethread roller 717a or c to move away from the rethreading shaft 641. If the threaded roving is cut by the shear mechanism in the manner hereinafter described, rethreading is accomplished in generally the same manner as threading. Specifically, the related rethread actuator is energized to pull the idler roller 727a or c against the rethread roller 717a or c and press the roving against the silicon coated rethread shaft 641. The rotation of the rethread shaft pushes the roving further down the inclined channel 711a or c until it is again caught by the tack down roller 511 and pressed against an underlying surface. Thereafter, the rethread actuator is deenergized. After rethreading is complete, the threaded rovings are dispensed by the pulling action that occurs as the tack down roller presses the roving against the underlying surface. Like the various rollers that impinge on the rovings, preferably the channels through which the rovings pass are coated with a nonstick material. A suitable coating for the channels of module housings formed of the preferred material (aluminum) is a NEDOX type NH-1 coating applied by General Magnaplate, 2707 Palma Drive, Ventura, Calif. 93003.

Mounted in the housing 701a and c of each of the lower and upper forward modules, beneath the rethread mechanism 713a and c, is the shear mechanism 741a and c. Each shear mechanism includes a knife channel 743a and c in which is mounted a shear knife blade 745a and c. While the knife channel 743a is located beneath the inclined roving channel 711a and c, the end of the knife channel curves toward the roving channel 711a and c and meets the inclined roving channel upstream of the tip 709a and c of the undercut region 705a and c of the housings 701a and c of the upper and lower modules. Mounted in the undercut region 705a and c on the side of the inclined roving channel 711a and c opposite the point where the shear channel 745a and c meets the inclined roving channel 711a and c is a chopping block 747a and c.

The other end of each shear knife blade 745a and c extends beyond the other end of the knife channel 743a and c and is attached to one end of a slug 749a and c mounted in a cavity 751a and c. The shear knife blade 745a and c is adjustably attached to the slug 749a and c to allow for blade sharpening and position adjustment. The other end of each slug 749a and c extends into a slightly larger cavity 753a and c. The slightly larger cavity houses a plunger 757a and c attached to the end of the shaft of a pneumatic shear actuator 759a and c. Each plunger includes a cavity 755a and c that slidably receives a protrusion 754a and c formed in the end of the related slug 749a and c. See FIG. 26. The slidable connection between the slug 749a and c and the plunger 757a and c creates a dead zone between these elements. The dead zone allows the plunger to be moved a short distance toward the slug before the slug and, thus, the shear knife blade are moved down the knife channel toward the chopping block. The dead zone coupling is provided to allow the pneumatic actuator to overcome its seal friction and accelerate the plunger before the plunger impinges on the slug and moves the knife blade to cut a roving located in the inclined roving channel. As a result, the shear knife blade is rapidly accelerated, which results in a precise severing of a roving located between the end of the knife blade and the chopping block. The knife blade is returned to its retracted position by energizing the pneumatic actuator 759a and c in the reverse direction, i.e., in the direction that causes the actuator to withdraw its shaft and, thus, the plunger and the slug.

Intersecting each inclined roving channel 711a and c upstream of the point where the inclined roving channel intersects the knife channel 743a and c, on the side of the inclined roving channel opposite the knife channel, is an air channel 761a and c. The air channels are connected to a suitable source of pressurized air via a tube 763a and c. The resultant air flow directs rovings in the inclined roving channel 711a and c toward the tip 709a and c of the lower and upper forward housings 701a and c. Further, the airflow prevents severed rovings from sticking to the chopping block 747a and c.

As noted above, the lower and upper forward module housings 701a and c are substantially identical. The only difference between the configuration of the two housings is that the knife channel 743c of the upper forward module housings 703c curves through a slightly greater angle resulting in the slug 749c and the plunger cavity 753c lying along a line that is inclined from the horizontal more than the line along which the related items of the lower forward module housing 701a lie. This difference is necessary because the knife blade pneumatic actuators, which are cylindrical, have a larger diameter than the thickness of the lower and upper forward module housings 701a and c. The difference allows the lower and upper forward modules to be mounted side-by-side in an alternating manner. The result is a relatively thin overall structure that is ideally suited to provide closely spaced rovings that can be interleaved with the rovings provided by the lower and upper rear module housings 701b and d. In this regard, attention is directed to FIG. 29 which is a side-elevational view showing the lower and upper roving modules mounted side-by-side in the manner just described. Attention is also directed to FIG. 28 which is a top view of the lower and upper forward modules and the lower and upper rear modules mounted in a side-by-side fashion and offset slightly from one another so that the rovings dispensed by the forward module housings are interleaved with the rovings dispensed by the rear module housings.

As noted above, the lower and upper rear modules include all of the mechanisms of the lower and upper forward modules. Since the mechanisms are the same, the rethreading mechanism 713b and d and the shear mechanism 741b and d of the lower and upper rear modules will not be described in detail here. Rather, only the differences are described. In this regard, the points 709b and d of the undercut regions 705b and d of the lower and upper rear module housings 701b and d are positioned slightly above the points 709a and c of the same regions of the lower and upper forward modular housing 701a and c when the rear modular housings are mounted in the subframe 503. Further, the knife channels 743b and d intersect the inclined roving channels 711b and d from above, rather than from below. As a result, the chopping blocks 747b and d are located beneath the lower roving channels 711b and d rather than above. In addition, the air channels 761b and d are located below the inclined roving channels 711b and d, rather than above, as in the lower and upper forward module housings 701a and c. Finally, when the slide links 731b and d mounted atop the lower and upper rear module housings 701b and d are pulled toward their respective connectors 731b and d, the rollers 727b and d mounted on their respective lever arms 729b and d push their associated rethread rollers 717b and d toward the related rethreading shaft 641. A pushing rather than a pulling action occurs because the lever arms 725b and d have their rotation pins located above the rollers 727b and d, rather than below, as in the upper and lower forward modules.

FIGS. 30-32 illustrate the mounting mechanism that holds the lower and upper forward modules and the lower and upper rear modules together so that the forward modules and the rear modules can be inserted as units between the right and left plates of the subframe. More specifically, a pair of forward module shafts 801a and b are positioned in aligned holes 803a and b formed in the main body 703a and c of each of the lower and upper forward modules. The length of the shafts 801a and b is equal to the combined thicknesses of the six forward modules (three upper and three lower) when these modules are positioned side-by-side in an alternating manner as previously described. Threaded set screw holes 805a and b that extend inwardly from the periphery of the forward module housings 701a and c to the module shaft holes 803a and b allow set screws (not shown) to be used to lock the modules in position on the module shafts 801a and b. Mounted on opposite sides of the thusly assembled lower and upper forward modules are a pair of plates 807a and b, one of which is shown in FIG. 31. The plates are generally rectangular and include holes via which cap screws attach the plates to the ends of the forward module shafts 801a and b. The plates, which have a generally rectangular shape, include outwardly extending wide protrusions 809. The wide protrusions 809 are configured to slide into wide slots formed in the inside walls of the right and left subframe plates 601 and 603, illustrated in FIG. 21. The wide protrusions extend inwardly from the upstream edges of the subframe plates, i.e., inwardly from the edges of the subframe plates located upstream of the tack down roller 511. As illustrated in FIG. 30, each of the wide protrusion plates 807a and b include an outwardly projecting flange 811 via which a lock screw 813 affixes the wide protrusion plates to the right and left subframe plates after the wide plates have been slid into the subframe plates.

The lower and upper rear module housings 701b and d are held together in a generally similar manner. More specifically, a pair of shafts 801c and d are mounted in pairs of aligned holes 803c and d formed in the rear modular housings 701b and d after the lower and upper rear modules are positioned side-by-side in an alternating manner. Set screws positioned in threaded holes 805c and d affix the rear modules to the shafts 801c and d. Attached to the ends of the shafts, on either side of the thusly assembled lower and upper rear modules, are a pair of attachment plates 815. FIG. 32 is a plan view of one of the attachment plates. The attachment plates includes a pair of parallel protrusions 817a and b located in their outer surface that are adapted to slide into corresponding slots formed in the inner surfaces of the right and left subframe plates 601 and 603. The slots are inclined upwardly from the lower edges of the subframe plates. Thus, in the direction of tack down roller movement, the slots lie behind or downstream of the wide slots that receive the wide protrusion plates of the forward module mounting mechanism. Cap screws 810 that pass through apertures in the attachment plates and thread into the ends of the shafts 801c and d affix the attachment plates 815 to the assembled lower and upper rear modules. After being slid into position, the attachment plates 815 are affixed to the subframe plates by cap screws 820 that pass through holes formed in the right and left subframe plates and into threaded holes formed in the attachment plates 815.

Figure 21:
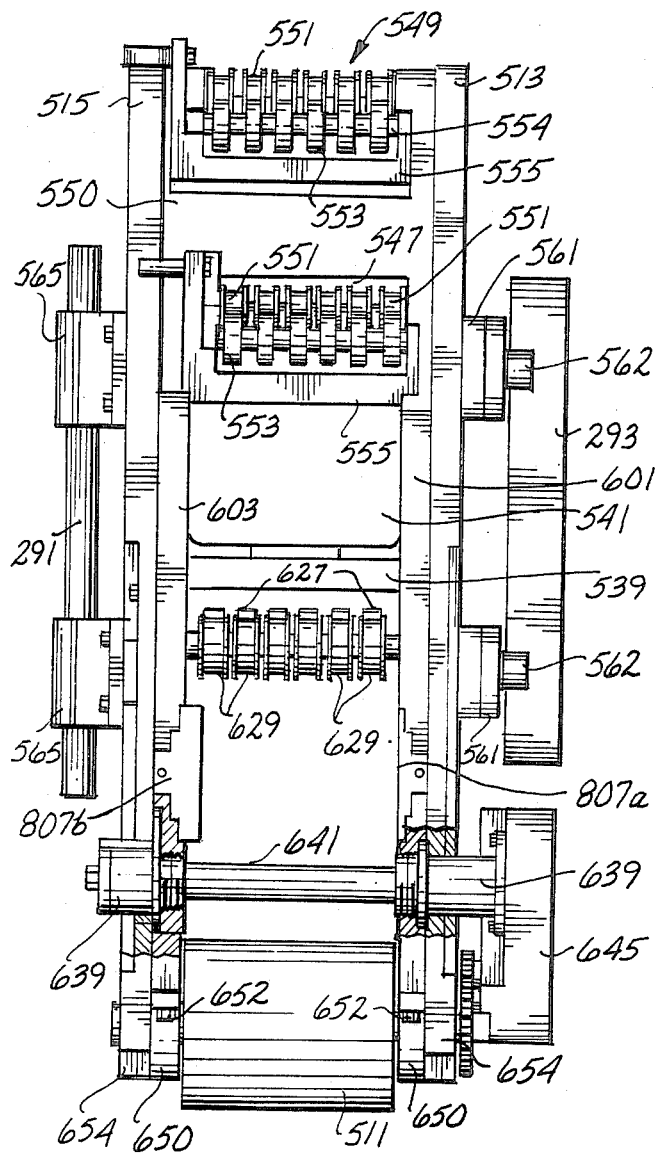
FIG. 21 is an end elevational view of the roving dispensing mechanism illustrated in FIG. 18.

As shown best in FIGS. 18, 21 and 24, the tack down roller 511 is mounted on the subframe 503. More specifically, the shaft 649 on which the tack down roller 511 is mounted is journaled in a first pair of bearing blocks 650, one located on either side of the roller. The bearing blocks have a trapezoidal upper shape that conforms to trapezoidal-shaped apertures located at the bottom of the subframe plates 601 and 603. After being mounted in the trapezoidal-shaped apertures, the bearing blocks are attached to the subframe plates by bolts 652. A second pair of bearing blocks 654 are also mounted on the tack down roller shaft, outside of the bearing blocks 652. The second pair of bearing blocks are configured to slip into corresponding apertures located in the base of the right and left mainframe plates 513 and 515.

The subframe plates 601 and 603 are attached to the right and left plates 513 and 515 of the mainframe 501 by hold down lock mechanisms 822. The hold down lock mechanisms 822 include two slots 824 formed in each of the right and left plates 513 and 515, four bolts 826 that pass through the slots into threaded holes in the subframe plates 601 and 603 and four cover plates 828 that are pressed against the outer faces of the right and left plates 513 and 515 byb the bolts. The slots allows the angle of the lower and upper forward and rear module housings 701a, b, c and d to be adjusted with respect to the rotational axis of the tack down roller 511. Thus, the feed angle of the fiber rovings with respect to the point of contact between the tack down roller 511 and an underlying surface is adjustable.

As shown in FIG. 33, the laser camera system 512 (FIG. 18) is based on optical triangulation and includes a pair of laser cameras 821. The laser cameras 821 are mounted on opposite sides of the path-of-travel of the tack down roller 511. More specifically, the housings 823 of the laser cameras are attached to the base of the support structure, illustrated in FIG. 9 and heretofore described, on opposite sides of the cavity created by the rectangular openings 283, the vertical plates 287 and 289 and the upper plate 285.

Each laser camera 821 includes a laser 825 mounted so as to produce an IR beam 827 that orthogonally intersects the line defined by the point of contact between the tack down roller 511 and a flat underlying surface 829 against which rovings are pressed by the tack down roller. Positioned to receive the IR light reflected by the underlying surface 829 are lenses 831. The lenses image light on photodetector arrays 833. A normal or quiescent state exists when both reflected IR beams are at the same position (normally the center) on their respective photodetectors. When this state exists the tack down roller is flush with the underlying surface. If the inclination of the underlying surface changes, as shown by line 835 in FIG. 33, the position of the reflected IR beams on the photodetector arrays 833 becomes unbalanced. As a result, the photodetected arrays produce unbalanced outputs. In accordance with the invention, the unbalanced outputs are used to control the energization of the a-axis servo motor 260 (FIG. 8) in a way that causes the front and rear plates 265 and 267 of the support structure to tilt by the amount needed to move the tack down roller to a position where it is again flush with the underlying surface.

Figure 34:
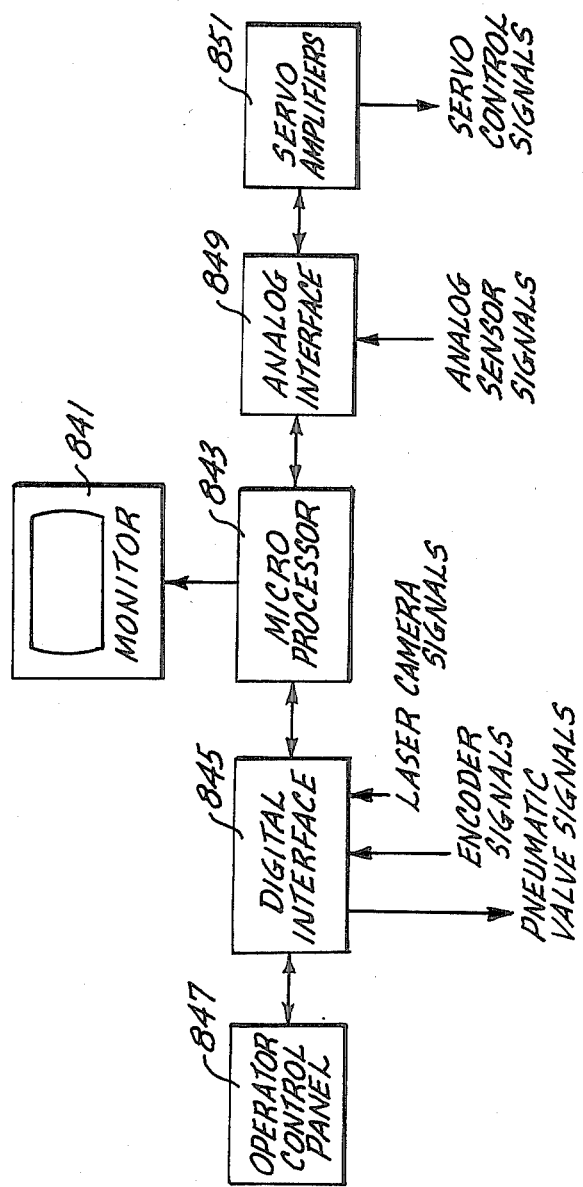
FIG. 34 is a block diagram of a computer based control system for controlling a multiroving fiber laminator formed in accordance with the invention.

FIG. 34 is a block diagram of a computer based control system for controlling a fiber laminator formed in accordance with the invention. The control system illustrated in FIG. 34 includes; a monitor 841; a microprocessor 843; a digital interface 845; an operator control panel 847; an analog interface 849; and, servo amplifiers 851. The operator control panel includes a device, such as a tape or disc drive, suitable for reading a numerical control (N/C) program. The numerical control signals are supplied to the digital interface 845 to the microprocessor. Signals produced by various digital based sensors, such as the laser cameras, position encoders that form part of the servo drive systems, etc., are also supplied to the microprocessor 843 via the digital interface 845. Analog sensor signals are digitized by the analog interface and applied to the microprocessor. Based on the N/C program and/or other control signals produced by the operator control panel, such as override signals, the microprocessor produces pneumatic control signals that are applied to the pneumatic control valves by the digital interface and servo control signals that are converted to analog form by the analog interface and applied to the servos that control the position of the fiber laminator head along the controlled axes of movement.

Prior to operating the multiroving laminator of the invention to layup a fiber reinforced resin composite, a tool is positioned beneath the laminator head 53 in the work area defined by the gantry, the laminator head is moved to a home position and the rovings are threaded through the laminator head. Thereafter, a numerical control (N/C) program, which has previously been entered by an operator 901 into a control console 903 containing the electronic subsystems illustrated in FIG. 34, is started. The numerical program controls the X, Y, Z and c-axis servo motors. The a-axis servo motor may be fully controlled by the signal produced by the laser cameras; or the laser camera signals may be used to modify a-axis control signals. Further, the laser camera signals can be used to modify, i.e., correct, the signals that control the X, Y, and Z axis servo motors. In any event, based on the numerical controls signals, the servo motors are energized to move the laminator head over the surface of the tool. During such movement the tack down roller is pressed against the tool surface with a predetermined amount of force -- 35 psi, for example. Gauge pressure by the air bag may be approximately 20 psi. The tack down roller force pulls the rovings from their supply spools through the laminator head. Either all or part of the rovings can be pulled through the head and pressed against the tool.

The preferred form of the invention has two modes of operation. In the first mode movement along all axes is controlled by numerical control (N/C) signals. In this mode the laser cameras are inoperative. In the second mode of operation the laser camera signals control Z and a-axis movement, and provide connection signals for X and Y-axis movement.

After a first "tape" formed of side-by-side rovings is laid up, a second tape is laid next to the first tape. After a first layer is laid down, a second layer is laid atop the first layer. These actions continue until the entire composite is laid up. As the tapes and layers are laid down, the laminator head is rotated about the c-axis in accordance with the c-axis N/C signals. The tapes being laid down as such movement occurs remain flat because each roving feed rate is independent. Further, the width of tapes being laid down is varied as dicated by N/C signals applied to the shear actuators and the rethread actuators. Immediately after a roving is sheared the brake of the related hub and brake mechanism is actuated to stop free wheeling of the related roving spool. Roving dispensing is restarted by energizing the related rethread actuators, releasing the brake pressure and reducing nip roller pressure. After a suitable rethreading period drag brake pressure and nip roller pressure are reapplied.

As will be readily appreciated from the foregoing description, the invention provides a multiroving fiber laminator having several features that make it uniquely suited for laying up fiber reinforced resin composites having complex surface shapes. While the invention is ideally suited for use in creating airfoils, it can be used to create other structures, particularly panel-type structures. The features of the invention of most significance lie in the provision of a roving dispensing head having the ability to dispense side-by-side rovings at independent rates and to independently terminate and restart the dispensing of each roving. Independent roving dispensing allows the dispensing head to be turned through a relatively sharp arc in the plane of the dispensed rovings. The ability to independently terminate and start up the dispensing of each roving allows the width of the side-by-side rovings to be changed as required by the part being laid up. Another feature of the invention of significance is the use of a pressure chamber to maintain a tack down roller pressed against an underlying surface with a relatively constant pressure over small changes in surface elevation. A further feature of significance is the inclusion of depth sensing laser cameras mounted on opposite sides of the tack down roller and the use of the depth information produced by the cameras to maintain the tack down roller flush with the underlying surface. The use of sensor information to modify or combine with the numerical control signals used to control servo motors that move the dispensing head along multiple axes in order to maintain a tack down roller flush with an underlying surface provides automatic compensation for contour changes resulting in a reduction in the complexity of the numerical control signals. Another feature of note is the mounting of the roving spools on a portion of the support structure that moves with head movement. This arrangement voids the roving conflicts that occur when roving spools are mounted on other structures, such as a Z-axis truss.

While a preferred embodiment of the invention has been illustrated and described, it is to be understood that various changes can be made therein without departing from the spirit and scope of the invention. Hence, the invention can be particed otherwise than as specifically described herein.

The embodiments of the invention in which an exclusive property or priviledge is claimed are defined as follows:

1. A multiroving fiber laminator for laying up fiber reinforced resin composites comprising:
   (A) a gantry for moving a fiber laminator head along a controllable, complex path of travel; and,
   (B) a fiber laminator head mounted on said gantry for movement along said controllable, complex path of travel, said fiber laminator head including:
      (1) a roving supply mechanism for supplying a plurality of flat rovings at independent rates; and,
      (2) a roving dispensing mechanism for receiving said plurality of rovings; side-by-side dispensing said plurality of rovings; at indpendent rates and, pressing said side-by-side plurality of rovings against an underlying surface to create a roving strip as said gantry moves said fiber laminator head along said controllable, complex path of travel.

2. A multiroving fiber laminator as claimed in claim 1 wherein said roving dispensing mechanism includes severing means for selectively terminating the dispensing of one or more of said plurality of rovings as said plurality of rovings are being dispensed and pressed against an underlying surface to vary the width of said roving strip.

3. A multiroving fiber laminator as claimed in claim 2 wherein said roving dispensing mechanism includes rethreading means for selectively reinitiating the dispensing of rovings not being dispensed.

4. A multiroving fiber laminator as claimed in claim 3 including a support structure for attaching said roving dispensing mechanism to said gantry.

5. A multiroving fiber laminator as claimed in claim 4 wherein said fiber laminator head includes:
    slide mounting means for attaching said roving dispensing mechanism to said support structure such that said dispensing mechanism is vertically movable with respect to said support structure over a limited distance; and,
    pressure means mounted between said roving dispensing mechanism and said support structure for pushing said dispensing head vertically downwardly away from said support structure with an amount of force that is substantially constant over the range of limited movement allowed by said slide mounted means.

6. A multiroving fiber laminator as claimed in claim 5 wherein said roving dispensing mechanism includes a plurality of modules, each of said modules receiving one of said plurality of flat rovings from said roving supply mechanism and dispensing said roving.

7. A multiroving fiber laminator as claimed in claim 6 wherein said severing means includes a severing mechanism mounted in each of said modules for severing the roving dispensed by said module.

8. A multiroving fiber laminator as claimed in claim 7 wherein said rethreading means includes a rethreading mechanism mounted in each of said modules for rethreading the roving dispensed by said module by initiating movement of said roving through said module.

9. A multiroving fiber laminator as claimed in claim 8 wherein said roving dispensing mechanism includes a tack down roller for receiving rovings from said modules and pressing said roving against an underlying surface in a side-by-side manner to create said roving strip.

10. A multiroving fiber laminator as claimed in claim 9 wherein said roving dispensing mechanism includes a mainframe and a subframe, said slide mounting means for attaching said roving dispensing mechanism to said support structure being partially mounted on said mainframe and partially mounted on said support structure, said subframe being mounted on said mainframe and said modules and said tack down roller being mounted on said subframe.

11. A multiroving fiber laminator as claimed in claim 10 wherein:
    each of said modules includes a roving channel through which its respective roving passes; and,
    said severing mechanism includes a knife channel that intersects said roving channel, a knife blade slidably mounted in said knife channel and a knife actuator attached to said knife for sliding said knife in said knife channel through said intersection to severe a roving in said roving channel.

12. A multiroving fiber laminator as claimed in claim 11 wherein said rethreading mechanism comprises: a rethreading roller common to more than one of said modules; a movable roller mounted in each of said modules adjacent said common roller for movement toward and away from said common roller; and, an actuating mechanism for pressing said movable roller against said common roller, said roving passing between said movable roller and said common roller prior to entering said roving channel.

13. A multiroving fiber laminator as claimed in claim 12 including air means for applying pressurized air to said roving channel slightly upstream of said intersection between said roving channel and said knife channel.

14. A multiroving fiber laminator as claimed in claim 13 wherein said roving supply mechanism includes a plurality of hub and brake mechanisms one for each of said plurality of said flat rovings, said hub and brake mechanisms including hubs suitable for receiving a spool on which a flat roving is wound and a brake mechanism for applying a brake force to said hub.

15. A multiroving fiber laminator as claimed in claim 14 wherein said brake mechanism is controllable to apply a brake force, a drag force or no control force to its associated hub.

16. A multiroving fiber laminator as claimed in claim 15 wherein said roving supply mechanism also includes a plurality of nip rollers, one for each of said flat rovings, one of said nip rollers being associated with each of said hub and brake mechanisms for receiving a roving from said related hub and brake mechanism and directing said roving to said modules, said nip rollers applying a predetermined amount of force to said rovings to maintain the flatness thereof and removing slight imperfections therefrom.

17. A multiroving fiber laminator as claimed in claim 16 including laser camera means mounted adjacent said tack down roller for detecting the inclination between said tack down roller and an underlying surface.

18. A multiroving fiber laminator as claimed in claim 17 wherein said gantry includes positioning mechanisms for moving said fiber laminator head along at least two orthogonal longitudinal paths of travel.

19. A multiroving fiber laminator as claimed in claim 18 wherein said gantry means includes positioning mechanisms for moving said fiber laminator head along three orthogonal linear axes of travel, two of which lie in a substantialy horizontal plane and the other of which lies vertical.

20. A multiroving fiber laminator as claimed in claim 18 wherein said gantry also includes a positioning mechanism for positioning said fiber laminator head along a rotational axis located about said vertical axis.

21. A multiroving fiber laminator as claimed in claim 20 wherein said roving dispensing mechanism includes a positioning mechanism for rotationally positioning said dispensing head about a horizontal axis.

22. A multiroving fiber laminator as claimed in claim 3 wherein said roving dispensing mechanism includes a plurality of modules, each of said modules receiving one of said plurality of flat rovings from said roving supply mechanism and dispensing said roving.

23. A multiroving fiber laminator as claimed in claim 22 wherein said severing means includes a severing mechanism mounted in each of said modules for severing the roving dispensed by said module.

24. A multiroving fiber laminator as claimed in claim 23 wherein said rethreading means includes a rethreading mechanism mounted in each of said modules for rethreading the roving dispensed by said module by initiating movement of said roving through said module.

25. A multiroving fiber laminator as claimed in claim 24 wherein:
    each of said modules includes a roving channel through which its respective roving passes; and,
    said severing mechanism includes a knife channel that intersects said roving channel, a knife blade slidably mounted in said knife channel and a knife actuator attached to said knife for sliding said knife in said knife channel through said intersection to sever a roving said roving channel.

26. A multiroving fiber laminator as claimed in claim 25 wherein said rethreading mechanism comprises; a rethreading roller common to more than one of said modules; a movable roller mounted in each of said modules adjacent said common roller for movement toward and away from said common rollers; and, an actuating mechanism for pressing said movable roller against said common roller, said roving passing between said movable roller and said common roller prior to entering said roving channel.

27. A multiroving fiber laminator as claimed in claim 26 including air means for applying pressurized air to said roving channel slightly upstream of said intersection between said roving channel and said knife channel.

28. A multiroving fiber laminator as claimed in claim 1 including a support structure for attaching said roving dispensing mechanism to said gantry.

29. A multiroving fiber laminator as claimed in claim 28 wherein said fiber laminator head includes:
    slide mounting means for attaching said roving dispensing mechanism to said support structure such that said roving dispensing mechanism is vertically movable with respect to said support structure over a limited distance; and,
    pressure means mounted between said roving dispensing mechanism and said support structure for pushing said dispensing head vertically downwardly away from said support structure with an amount of force that is substantially constant over the range of limited movement allowed by said slide mounting means.

30. A multiroving fiber laminator as claimed in claim 1 wherein said roving dispensing mechanism includes a tack down roller for receiving rovings from said roving supply mechanism and pressing said rovings against an underlying surface in a side-by-side manner to create said roving strip.

31. A multiroving fiber laminator as claimed in claim 30 including laser camera means mounted adjacent said tack down roller for detecting the inclination between said tack down roller and an underlying surface.

32. A multiroving fiber laminator as claimed in claim 1 wherein said roving supply mechanism includes a plurality of hub and brake mechanisms one for each of said plurality of flat rovings, said hub and brake mechanisms including hubs suitable for receiving a spool on which a flat roving is wound and a brake mechanism for applying a brake force to said hub.

33. A multiroving fiber laminator as claimed in claim 32 wherein said brake mechanism is controllable to apply a brake force, a drag force or no control force to its associated hub.

34. A multiroving fiber laminator as claimed in claim 33 wherein said roving supply mechanism also includes a plurality of nip rollers, one for each of said flat rovings, one of said nip rollers being associated with each of said hub and brake mechanisms for receiving a roving from said related hub and brake mechanism and directing said roving to said modules, said nip rollers applying a predetermined amount of force to said rovings to maintain the flatness thereof and remove slight imperfections therefrom.

35. A multiroving fiber laminator as claimed in claim 1 wherein said gantry includes positioning mechanisms for moving said fiber laminator head along at least two orthogonal longitudinal paths of travel.

36. A multiroving fiber laminator as claimed in claim 35 wherein said gantry means includes positioning mechanisms for moving said fiber laminator head along three orthogonal linear axes of travel, two of which lie in a substantially horizontal plane and the other of which lies vertical.

37. A multiroving fiber laminator as claimed in claim 36 wherein said gantry also includes a positioning mechanism for positioning said fiber laminator head.

38. A multiroving fiber laminator as claimed in claim 37 wherein said roving dispensing mechanism includes a positioning mechanism for rotationally positioning said dispensing head about a horizontal axis.

* * * * *